(12) United States Patent
Simpson et al.

(10) Patent No.: US 12,124,976 B2
(45) Date of Patent: *Oct. 22, 2024

(54) MARKET EXCHANGE FOR TRANSPORTATION CAPACITY IN TRANSPORTATION VEHICLES

(71) Applicant: CirclesX LLC, Houston, TX (US)

(72) Inventors: Erik M Simpson, Houston, TX (US); Stuart Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 892 days.

This patent is subject to a terminal disclaimer.

(21) Appl. No.: 15/877,393

(22) Filed: Jan. 23, 2018

(65) Prior Publication Data
US 2019/0228351 A1    Jul. 25, 2019

(51) Int. Cl.
*G06Q 10/02* (2012.01)
*G01C 21/34* (2006.01)
(Continued)

(52) U.S. Cl.
CPC ......... *G06Q 10/025* (2013.01); *G01C 21/343* (2013.01); *G01S 19/42* (2013.01);
(Continued)

(58) Field of Classification Search
CPC ...... G06Q 10/025; G06Q 40/04; G06Q 30/08; G06Q 50/30; G01C 21/343
See application file for complete search history.

(56) References Cited

U.S. PATENT DOCUMENTS

D209,710 S    12/1967  Bruce
4,476,954 A   10/1984  Johnson et al.
(Continued)

FOREIGN PATENT DOCUMENTS

CN    107341968 A    11/2017
GB      2539556 A    12/2016
(Continued)

OTHER PUBLICATIONS

Zheyong Bian, Planning the Ridesharing Route for the First-Mile Service Linking to Railway Passenger Transportation, Apr. 2017, Joint Rail Conference (Year: 2017).*
(Continued)

*Primary Examiner* — Resha Desai
*Assistant Examiner* — Ismail A Manejwala
(74) *Attorney, Agent, or Firm* — Pramudji Law Group PLLC; Ari Pramudji

(57) ABSTRACT

Implementations of various methods and systems of a network, GPS system, mobile computing devices, servers, forward commodity exchanges, grouping software for hubs, transparent open access pricing systems, blockchain audit and safety methods and systems, virtual hub systems, algorithm methods for no arbitrage conditions in a simple easy to use graphical user interface format for mobile or virtual computing over various mediums which are connected via a network to transact and trade transportation seats or capacity units in airline transport, subway transport, train transport, automobile transport, autonomous vehicle transport, taxi transport, space transport, virtual transport, underground transport, ship or sea transport, public transport, private transport or drone transport on a computer, mobile computer device, virtual reality computer device or mixed reality computing device.

25 Claims, 17 Drawing Sheets

(51) Int. Cl.
*G01S 19/42* (2010.01)
*G06F 3/0482* (2013.01)
*G06Q 10/109* (2023.01)
*G06Q 30/08* (2012.01)
*G06Q 40/04* (2012.01)
*G06Q 50/30* (2012.01)
*G06F 3/04842* (2022.01)

(52) U.S. Cl.
CPC ............ *G06Q 10/109* (2013.01); *G06Q 30/08* (2013.01); *G06Q 40/04* (2013.01); *G06Q 50/30* (2013.01); *G06F 3/04842* (2013.01)

(56) References Cited

U.S. PATENT DOCUMENTS

| | | |
|---|---|---|
| D318,073 S | 7/1991 | Jang |
| 5,249,259 A | 9/1993 | Harvey |
| 5,412,560 A | 5/1995 | Dennison |
| 5,604,676 A | 2/1997 | Penzias |
| 5,726,885 A | 3/1998 | Klein et al. |
| 5,751,245 A | 3/1998 | Klein et al. |
| 5,973,619 A | 10/1999 | Paredes |
| 6,175,831 B1 | 1/2001 | Weinreich et al. |
| 6,240,396 B1 | 5/2001 | Walker et al. |
| 6,285,999 B1 | 9/2001 | Page |
| D453,945 S | 2/2002 | Shan |
| 6,356,838 B1 | 3/2002 | Paul |
| 6,400,996 B1 | 6/2002 | Hoffberg |
| D460,952 S | 7/2002 | Kataoka |
| 6,421,606 B1 | 7/2002 | Asai et al. |
| 6,434,530 B1 | 8/2002 | Sloane et al. |
| D468,738 S | 1/2003 | Lin |
| D469,089 S | 1/2003 | Lin |
| 6,609,103 B1 | 8/2003 | Kolls |
| 6,618,062 B1 | 9/2003 | Brown et al. |
| 6,646,659 B1 | 11/2003 | Brown et al. |
| 6,663,564 B2 | 12/2003 | Miller-Kovach et al. |
| 6,708,879 B2 | 3/2004 | Hunt |
| 6,850,907 B2 | 2/2005 | Lutnick et al. |
| 7,090,638 B2 | 8/2006 | Vidgen |
| 7,373,320 B1 | 5/2008 | Mcdonough |
| D590,396 S | 4/2009 | Lo |
| 7,584,123 B1 | 9/2009 | Karonis et al. |
| 7,634,442 B2 | 12/2009 | Alvarado et al. |
| 7,680,690 B1 | 3/2010 | Catalano |
| 7,680,770 B1 | 3/2010 | Buyukkokten et al. |
| 7,711,629 B2 | 5/2010 | Laurent et al. |
| 7,747,739 B2 | 6/2010 | Bridges et al. |
| 7,756,633 B2 | 7/2010 | Huang et al. |
| 7,788,207 B2 | 8/2010 | Alcorn et al. |
| D628,171 S | 11/2010 | Hakopian |
| 7,886,166 B2 | 2/2011 | Shnekendorf et al. |
| D638,879 S | 5/2011 | Suto |
| 7,987,110 B2 | 7/2011 | Cases et al. |
| 8,024,234 B1 | 9/2011 | Thomas et al. |
| 8,065,191 B2 | 11/2011 | Senior |
| D650,385 S | 12/2011 | Chiu |
| 8,121,780 B2 | 2/2012 | Gerdes et al. |
| 8,249,946 B2 | 8/2012 | Froseth et al. |
| 8,296,335 B2 | 10/2012 | Bouve et al. |
| 8,388,451 B2 | 3/2013 | Auterio et al. |
| 8,570,244 B2 | 10/2013 | Mukawa |
| 8,762,035 B2 | 6/2014 | Levine et al. |
| 8,798,593 B2 | 8/2014 | Brown et al. |
| 8,918,411 B1 | 12/2014 | Latif et al. |
| 8,920,175 B2 | 12/2014 | Black et al. |
| 8,930,490 B2 | 1/2015 | Brown et al. |
| 8,968,099 B1 | 3/2015 | Hanke et al. |
| 9,011,153 B2 | 4/2015 | Bennett et al. |
| 9,020,763 B2 | 4/2015 | Faaborg et al. |
| 9,077,204 B2 | 7/2015 | More et al. |
| 9,092,826 B2 | 7/2015 | Deng et al. |
| 9,159,088 B2 | 10/2015 | Dillahunt et al. |
| 9,213,957 B2 | 12/2015 | Stefik et al. |
| 9,274,540 B2 | 3/2016 | Anglin et al. |
| 9,292,764 B2 | 3/2016 | Yun et al. |
| 9,387,928 B1 | 7/2016 | Gentry et al. |
| 9,389,090 B1 | 7/2016 | Levine et al. |
| 9,389,094 B2 | 7/2016 | Brenner et al. |
| 9,410,963 B2 | 8/2016 | Martin et al. |
| 9,436,923 B1 | 9/2016 | Sriram et al. |
| D772,828 S | 11/2016 | Kusumoto |
| 9,528,972 B2 | 12/2016 | Minvielle |
| 9,558,515 B2 | 1/2017 | Babu et al. |
| 9,665,983 B2 | 5/2017 | Spivack |
| 9,880,577 B2 | 1/2018 | Dyess et al. |
| 9,952,042 B2 | 4/2018 | Abovitz et al. |
| 9,960,637 B2 | 5/2018 | Sanders et al. |
| 9,978,282 B2 | 5/2018 | Lambert et al. |
| 10,082,793 B1 | 9/2018 | Glaser |
| D832,355 S | 10/2018 | Castro |
| 10,262,289 B2 | 4/2019 | Vaananen |
| 10,395,332 B1 | 8/2019 | Konrardy et al. |
| 10,403,050 B1 | 9/2019 | Beall et al. |
| 10,460,520 B2 | 10/2019 | Simpson et al. |
| 10,533,850 B2 | 1/2020 | Abovitz et al. |
| 10,586,084 B2 | 3/2020 | Burch et al. |
| 10,685,503 B2 | 6/2020 | Ricci |
| 10,737,585 B2 | 8/2020 | Chaudhary et al. |
| D896,315 S | 9/2020 | Castro |
| 10,832,337 B1 | 11/2020 | Floyd et al. |
| 10,872,381 B1 | 12/2020 | Leise et al. |
| D910,758 S | 2/2021 | Leong |
| 11,035,682 B2 | 6/2021 | Simpson |
| 11,138,827 B2 | 10/2021 | Simpson |
| D938,375 S | 12/2021 | Zhang |
| 11,215,466 B2 | 1/2022 | Simpson |
| 11,288,563 B2 | 3/2022 | Lee et al. |
| 11,296,897 B2 | 4/2022 | Endress et al. |
| 11,298,017 B2 | 4/2022 | Tran |
| 11,298,591 B2 | 4/2022 | Evancha |
| 11,537,953 B2 | 12/2022 | Beaurepaire |
| 11,555,709 B2 | 1/2023 | Simpson |
| 11,586,993 B2 | 2/2023 | Handler et al. |
| D980,210 S | 3/2023 | Wu |
| 11,651,464 B2 | 5/2023 | Park |
| D993,316 S | 7/2023 | Lin |
| 11,734,618 B2 | 8/2023 | Ogden |
| D1,000,137 S | 10/2023 | Shuster |
| D1,007,451 S | 12/2023 | Im |
| D1,024,065 S | 4/2024 | Kim |
| 2002/0004788 A1 | 1/2002 | Gros et al. |
| 2002/0013718 A1 | 1/2002 | Cornwell |
| 2002/0013761 A1 | 1/2002 | Bundy |
| 2002/0017997 A1 | 2/2002 | Wall |
| 2002/0065738 A1 | 5/2002 | Riggs et al. |
| 2002/0065766 A1 | 5/2002 | Brown et al. |
| 2002/0128952 A1 | 9/2002 | Melkomaian |
| 2002/0133456 A1 | 9/2002 | Lancaster et al. |
| 2002/0161689 A1 | 10/2002 | Segal |
| 2003/0055776 A1 | 3/2003 | Samuelson |
| 2003/0191725 A1 | 10/2003 | Ratliff et al. |
| 2003/0233311 A1 | 12/2003 | Bramnick et al. |
| 2004/0019552 A1 | 1/2004 | Tobin |
| 2004/0115596 A1 | 6/2004 | Snyder et al. |
| 2004/0249742 A1* | 12/2004 | Laurent .................. G06Q 10/08 705/37 |
| 2004/0260581 A1 | 12/2004 | Baranowski et al. |
| 2005/0021346 A1 | 1/2005 | Nadan et al. |
| 2005/0027637 A1 | 2/2005 | Kohler |
| 2005/0132070 A1 | 6/2005 | Redlich et al. |
| 2005/0288974 A1 | 12/2005 | Baranowski et al. |
| 2005/0288986 A1 | 12/2005 | Barts et al. |
| 2006/0104224 A1 | 5/2006 | Singh |
| 2007/0005224 A1 | 1/2007 | Sutardja |
| 2008/0033833 A1 | 2/2008 | Senior |
| 2008/0040232 A1 | 2/2008 | Perchthaler |
| 2008/0077309 A1 | 3/2008 | Cobbold |
| 2008/0129490 A1 | 6/2008 | Linville et al. |
| 2008/0140557 A1 | 6/2008 | Bowlby et al. |
| 2008/0157990 A1 | 7/2008 | Belzer et al. |
| 2008/0195432 A1 | 8/2008 | Fell et al. |
| 2008/0262892 A1 | 10/2008 | Prager et al. |

(56) References Cited

U.S. PATENT DOCUMENTS

| | | |
|---|---|---|
| 2009/0221338 A1 | 9/2009 | Stewart |
| 2009/0231687 A1 | 9/2009 | Yamamoto |
| 2009/0271236 A1 | 10/2009 | Ye et al. |
| 2009/0275002 A1 | 11/2009 | Hoggle |
| 2009/0276154 A1 | 11/2009 | Subramanian et al. |
| 2009/0287401 A1 | 11/2009 | Levine et al. |
| 2009/0309729 A1 | 12/2009 | Nichols |
| 2010/0042421 A1 | 2/2010 | Bai et al. |
| 2010/0081548 A1 | 4/2010 | Labedz |
| 2010/0114790 A1 | 5/2010 | Strimling et al. |
| 2010/0191834 A1 | 7/2010 | Zampiello |
| 2010/0211441 A1 | 8/2010 | Sprigg et al. |
| 2010/0217680 A1 | 8/2010 | Fusz et al. |
| 2010/0228574 A1 | 9/2010 | Mundinger et al. |
| 2010/0280748 A1 | 11/2010 | Mundinger et al. |
| 2010/0280884 A1 | 11/2010 | Levine et al. |
| 2010/0306078 A1 | 12/2010 | Hwang |
| 2011/0025267 A1 | 2/2011 | Kamen et al. |
| 2011/0059693 A1 | 3/2011 | O'Sullivan |
| 2011/0098056 A1 | 4/2011 | Rhoads et al. |
| 2011/0106660 A1 | 5/2011 | Bai et al. |
| 2011/0202418 A1 | 8/2011 | Kempton et al. |
| 2012/0023032 A1* | 1/2012 | Visdomini ....... G06Q 10/08355 705/338 |
| 2012/0075067 A1 | 3/2012 | Attaluri |
| 2012/0078743 A1 | 3/2012 | Betancourt |
| 2012/0101629 A1 | 4/2012 | Olsen et al. |
| 2012/0158762 A1 | 6/2012 | IwuchukWu |
| 2012/0303259 A1 | 11/2012 | Prosser |
| 2012/0323645 A1 | 12/2012 | Spiegel et al. |
| 2013/0024041 A1 | 1/2013 | Golden et al. |
| 2013/0132261 A1 | 5/2013 | Ebersole |
| 2013/0147820 A1 | 6/2013 | Kalai et al. |
| 2013/0173326 A1 | 7/2013 | Anglin et al. |
| 2013/0179205 A1 | 7/2013 | Slinin |
| 2013/0191237 A1 | 7/2013 | Tenorio |
| 2013/0211863 A1 | 8/2013 | White |
| 2013/0265174 A1 | 10/2013 | Scofield et al. |
| 2013/0268325 A1 | 10/2013 | Dembo |
| 2013/0275156 A1 | 10/2013 | Kinkaid et al. |
| 2013/0304522 A1 | 11/2013 | Cundle |
| 2013/0311264 A1 | 11/2013 | Solomon et al. |
| 2014/0038781 A1 | 2/2014 | Foley |
| 2014/0075528 A1 | 3/2014 | Matsuoka |
| 2014/0098009 A1 | 4/2014 | Prest et al. |
| 2014/0122190 A1 | 5/2014 | Wolfson et al. |
| 2014/0129302 A1 | 5/2014 | Amin et al. |
| 2014/0149157 A1 | 5/2014 | Shaam et al. |
| 2014/0162598 A1 | 6/2014 | Villa-Real |
| 2014/0180732 A1 | 6/2014 | Rotchin |
| 2014/0220516 A1 | 8/2014 | Marshall et al. |
| 2014/0229258 A1 | 8/2014 | Seriani |
| 2014/0236641 A1 | 8/2014 | Dawkins |
| 2014/0244413 A1 | 8/2014 | Senior |
| 2014/0310019 A1 | 10/2014 | Blander et al. |
| 2014/0310149 A1 | 10/2014 | Singh |
| 2014/0324633 A1 | 10/2014 | Pollak et al. |
| 2014/0349672 A1 | 11/2014 | Kern et al. |
| 2015/0006428 A1 | 1/2015 | Miller et al. |
| 2015/0016777 A1 | 1/2015 | Abovitz et al. |
| 2015/0058051 A1 | 2/2015 | Movshovich |
| 2015/0097864 A1 | 4/2015 | Alaniz |
| 2015/0154516 A1 | 6/2015 | Joachim |
| 2015/0161564 A1 | 6/2015 | Sweeney et al. |
| 2015/0178642 A1 | 6/2015 | Abboud |
| 2015/0198459 A1 | 7/2015 | MacNeille et al. |
| 2015/0206443 A1 | 7/2015 | Aylesworth et al. |
| 2015/0220916 A1 | 8/2015 | Prakash et al. |
| 2015/0241236 A1 | 8/2015 | Slusar et al. |
| 2015/0248689 A1 | 9/2015 | Paul et al. |
| 2015/0260474 A1 | 9/2015 | Rublowsky et al. |
| 2015/0269865 A1 | 9/2015 | Volach et al. |
| 2015/0324831 A1 | 11/2015 | Barua et al. |
| 2015/0348282 A1 | 12/2015 | Gibbon et al. |
| 2015/0371186 A1 | 12/2015 | Podgurny et al. |
| 2016/0041628 A1 | 2/2016 | Verma |
| 2016/0117657 A1 | 4/2016 | Forbes, Jr. et al. |
| 2016/0117756 A1 | 4/2016 | Carr et al. |
| 2016/0148289 A1 | 5/2016 | Altschuler |
| 2016/0162989 A1 | 6/2016 | Cole et al. |
| 2016/0171891 A1 | 6/2016 | Banatwala et al. |
| 2016/0203422 A1 | 7/2016 | Demarchi et al. |
| 2016/0224935 A1 | 8/2016 | Burnett |
| 2016/0225115 A1 | 8/2016 | Levy et al. |
| 2016/0253662 A1 | 9/2016 | Sriram |
| 2016/0307276 A1 | 9/2016 | Young |
| 2016/0297316 A1 | 10/2016 | Penilla et al. |
| 2016/0298977 A1 | 10/2016 | Newlin |
| 2016/0300296 A1 | 10/2016 | Alonso Cembrano |
| 2016/0307288 A1 | 10/2016 | Yehuda et al. |
| 2016/0307373 A1 | 10/2016 | Dean et al. |
| 2016/0321609 A1 | 11/2016 | Dube et al. |
| 2016/0349835 A1 | 12/2016 | Shapira |
| 2016/0364679 A1* | 12/2016 | Cao ........................ G06Q 50/30 |
| 2017/0019496 A1 | 1/2017 | Orbach |
| 2017/0039770 A1 | 2/2017 | Lanier et al. |
| 2017/0046658 A1 | 2/2017 | Jones et al. |
| 2017/0046664 A1 | 2/2017 | Haldenby et al. |
| 2017/0046799 A1 | 2/2017 | Chan et al. |
| 2017/0046806 A1 | 2/2017 | Haldenby et al. |
| 2017/0048216 A1 | 2/2017 | Chow et al. |
| 2017/0053461 A1 | 2/2017 | Pal et al. |
| 2017/0061509 A1 | 3/2017 | Rosenberg et al. |
| 2017/0089710 A1 | 3/2017 | Slusar |
| 2017/0122746 A1 | 5/2017 | Howard et al. |
| 2017/0146360 A1 | 5/2017 | Averbuch |
| 2017/0232300 A1 | 8/2017 | Tran et al. |
| 2017/0243286 A1 | 8/2017 | Castinado et al. |
| 2017/0243310 A1 | 8/2017 | Dawkins |
| 2017/0249626 A1 | 8/2017 | Marlatt |
| 2017/0276500 A1 | 9/2017 | Margalit et al. |
| 2017/0293881 A1 | 10/2017 | Narkulla |
| 2017/0293950 A1* | 10/2017 | Rathod ............. G06Q 30/0283 |
| 2017/0330274 A1 | 11/2017 | Conant, II et al. |
| 2017/0356749 A1 | 12/2017 | Shelby |
| 2017/0357914 A1 | 12/2017 | Tulabandhula |
| 2018/0012149 A1 | 1/2018 | Yust |
| 2018/0013211 A1 | 1/2018 | Ricci |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0053237 A1 | 2/2018 | Hayes et al. |
| 2018/0068355 A1 | 3/2018 | Garry |
| 2018/0075695 A1 | 3/2018 | Simpson |
| 2018/0095471 A1 | 4/2018 | Allan et al. |
| 2018/0102053 A1 | 4/2018 | Hillman et al. |
| 2018/0111494 A1 | 4/2018 | Penilla et al. |
| 2018/0117447 A1 | 5/2018 | Bao et al. |
| 2018/0121958 A1* | 5/2018 | Aist ........................ H04W 4/021 |
| 2018/0129276 A1 | 5/2018 | Nguyen et al. |
| 2018/0140903 A1 | 5/2018 | Poure |
| 2018/0143029 A1 | 5/2018 | Nikulin et al. |
| 2018/0157999 A1 | 6/2018 | Arora |
| 2018/0173742 A1 | 6/2018 | Liu et al. |
| 2018/0173800 A1 | 6/2018 | Chang et al. |
| 2018/0209803 A1 | 7/2018 | Rakah |
| 2018/0240542 A1 | 8/2018 | Grimmer |
| 2018/0278984 A1 | 9/2018 | Aimone et al. |
| 2018/0293638 A1 | 10/2018 | Simpson |
| 2018/0313798 A1 | 11/2018 | Chokshi et al. |
| 2018/0342106 A1 | 11/2018 | Rosado |
| 2018/0348863 A1 | 12/2018 | Aimone et al. |
| 2018/0357899 A1 | 12/2018 | Krivacic et al. |
| 2018/0365598 A1 | 12/2018 | Jamail |
| 2018/0365904 A1 | 12/2018 | Holmes |
| 2018/0374268 A1 | 12/2018 | Niles |
| 2019/0019144 A1 | 1/2019 | Gillen |
| 2019/0020973 A1 | 1/2019 | Harish |
| 2019/0047427 A1 | 2/2019 | Pogorelik |
| 2019/0050634 A1 | 2/2019 | Nerayoff et al. |
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |

(56) References Cited

U.S. PATENT DOCUMENTS

| | | | |
|---|---|---|---|
| 2019/0143828 | A1 | 5/2019 | Sawada et al. |
| 2019/0146974 | A1 | 5/2019 | Chung et al. |
| 2019/0158603 | A1 | 5/2019 | Nelson et al. |
| 2019/0160958 | A1 | 5/2019 | Chaudhary et al. |
| 2019/0178654 | A1 | 6/2019 | Hare |
| 2019/0186942 | A1 | 6/2019 | Rubin |
| 2019/0188450 | A1 | 6/2019 | Spivack et al. |
| 2019/0204110 | A1 | 7/2019 | Dubielzyk |
| 2019/0205798 | A1 | 7/2019 | Rosas-Maxemin et al. |
| 2019/0228269 | A1 | 7/2019 | Brent et al. |
| 2019/0236741 | A1 | 8/2019 | Bowman et al. |
| 2019/0236742 | A1 | 8/2019 | Tomskii et al. |
| 2019/0251503 | A1 | 8/2019 | Simpson |
| 2019/0251509 | A1 | 8/2019 | Simpson |
| 2019/0271553 | A1 | 9/2019 | Simpson |
| 2019/0272589 | A1 | 9/2019 | Simpson |
| 2019/0304000 | A1 | 10/2019 | Simpson |
| 2019/0311431 | A1 | 10/2019 | Simpson |
| 2019/0318286 | A1 | 10/2019 | Simpson |
| 2019/0325541 | A1 | 10/2019 | Simpson |
| 2019/0333166 | A1 | 10/2019 | Simpson |
| 2019/0333181 | A1 | 10/2019 | Simpson |
| 2019/0342106 | A1 | 11/2019 | Li et al. |
| 2019/0353499 | A1 | 11/2019 | Stenneth |
| 2020/0013498 | A1 | 1/2020 | Gelber |
| 2020/0027096 | A1 | 1/2020 | Cooner |
| 2020/0047055 | A1 | 2/2020 | Ward |
| 2020/0098071 | A1 | 3/2020 | Jackson |
| 2020/0125999 | A1 | 4/2020 | Simpson |
| 2020/0151816 | A1 | 5/2020 | Simpson |
| 2020/0156495 | A1 | 5/2020 | Lindup |
| 2020/0160461 | A1 | 5/2020 | Kaniki |
| 2020/0173808 | A1 | 6/2020 | Beaurepaire et al. |
| 2020/0219017 | A1 | 7/2020 | Simpson |
| 2020/0226853 | A1 | 7/2020 | Ahmed et al. |
| 2020/0317074 | A1 | 10/2020 | Miller et al. |
| 2020/0317075 | A1 | 10/2020 | Yokoyama et al. |
| 2020/0389301 | A1 | 12/2020 | Detres et al. |
| 2021/0012278 | A1 | 1/2021 | Alon et al. |
| 2021/0041258 | A1 | 2/2021 | Simpson |
| 2021/0042835 | A1 | 2/2021 | Simpson |
| 2021/0158447 | A1 | 5/2021 | Simpson |
| 2021/0166317 | A1 | 6/2021 | Simpson |
| 2021/0248633 | A1 | 8/2021 | Simpson |
| 2021/0318132 | A1 | 10/2021 | Simpson |
| 2021/0326872 | A1 | 10/2021 | Robotham |
| 2021/0379447 | A1 | 12/2021 | Lee |
| 2022/0020073 | A1 | 1/2022 | Farmer |
| 2022/0068081 | A1 | 3/2022 | Pariseau |
| 2022/0100731 | A1 | 3/2022 | Tirapu Azpiroz et al. |
| 2022/0122026 | A1 | 4/2022 | Okabe et al. |
| 2023/0157579 | A1 | 5/2023 | Sato |
| 2023/0377409 | A1 | 11/2023 | Rye |

FOREIGN PATENT DOCUMENTS

| | | | |
|---|---|---|---|
| JP | 2003177034 A | 12/2001 | |
| WO | 2001041084 A2 | 6/2001 | |
| WO | WO-0141084 A2 * | 6/2001 | ............. G06Q 10/02 |
| WO | 2015059691 A1 | 4/2015 | |
| WO | 2015161307 A1 | 4/2015 | |
| WO | WO-2018024844 A1 * | 2/2018 | ......... G06Q 30/0611 |
| WO | 2019/134005 A1 | 7/2019 | |
| WO | 2019183468 A1 | 9/2019 | |
| WO | 2021/163675 A1 | 8/2021 | |

OTHER PUBLICATIONS

PCT International Search Report and Written Opinion; PCT/US2020/027543; dated Jul. 1, 2020.
PCT International Search Report and Written Opinion; PCT/US2020/023223; dated Jun. 19, 2020.
PCT International Search Report and Written Opinion; PCT/US2020/023729; dated Jun. 18, 2020.
PCT International Search Report and Written Opinion; PCT/US2020/021546; dated Jun. 8, 2020.
PCT International Search Report and Written Opinion; PCT/US2020/018012; dated Apr. 21, 2020.
PCT International Search Report and Written Opinion; PCT/US2020/012208; dated Mar. 24, 2020.
Westerman; Longitudinal Analysis of Biomarker Data from a Personalized Nutrition Platform in Healthy Subjects; Nature, Scientific Reports; vol. 8; Oct. 2, 2018 (retrieved Jun. 10, 2020). https://www.nature.com/articles/s41598-018-33008-7.
Ahmed, et al.; Energy Trading with Electric Vehicles in Smart Campus Parking Lots; Applied Sciences; Sep. 7, 2018.
Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?.
Soccer ball-shaped drone might be the safest flying robot yet https://mashable.com/2015/12/21/soccer-ball-drone/ ; Dec. 21, 2015.
Fleishman; Use Parking Apps to Find Lots, Garages, Valet, and Meters; Macworld; Jul. 19, 2015.
Borras, et al. Intelligent Tourism Reminder Systems: A Survey; Expert Systems with Applications 41; Elsevier; Jun. 9, 2014.
Pentland; After Decades of Doubt, Deregulation Delivers Lower Electricity Rates; Forbes; Oct. 13, 2013 (retrieved Feb. 29, 2020). https://www.forbes.com/sites/williampentland/2013/10/13/after-decades-of-doubt-deregulation-delivers-lower-electricity-prices/#201d4a9c1d13.
Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.
U.S. Appl. No. 60/035,205, filed Jan. 10, 1997.
The Wayback Machine, Interest Rate Swaps, https://web.archive.org/web/20171006212154/https://global.pimco.com/en/gbl/resources/education/understanding-interest-rate-swaps, 2016, pp. 1-7.
Freight Derivatives—a Vital Tool for Your Business, https://www.reedsmith.com/-/media/files/perspectives/2007/02/ freight-derivatives--a-vital-tool-for-your-business/files/freight-derivatives--a vital-tool-for-your-business/fileattachment/etcfreightderivativesavitaltoolforyourbusiness.pdf (Year: 2007), Energy, Trade & Commodities, pp. 1-3.
Barry, Kieth, App lets drivers auction public parking spaces, Wired, Aug. 11, 2011, pp. 1-4.
Jiang, Landu, et al., Sun Chase: Energy-Efficient Route Planning for solar-powered Evs, IEEE 37th international conference on distrubuted computing systems, 2017, pp. 1-11.
Netlingo, https://web.archive.org/web/20170122184857/https://www.netlingo.com/word/electronic-exchange.php,dated Oct. 22, 2017.
Laseter, Tim, "B2B benchmark: The State of Electronic Exchanges", Tech & Innovation, dated Oct. 1, 2001.
Directed Graph, https://en.wikipedia.org/wiki/Directed_graph, pp. 1-6, 2022.
About IBM Food Trust, https://www.ibm.com/downloads/cas/E9DBNDJG, pp. 1-17, 2019.
IBM Blockchain Transparent Supply, https://www.ibm.com/downloads/cas/BKQDK0M2, pp. 1-14, Aug. 2020.
Radocchia, Samantha, 3 Innovative Ways Blockchain Will Build Trust in the Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.
Change the World, https://fortune.com/change-the-world/2019/ibm/, Fortune Media IP Limited, pp. 1-5, 2022.
IBM Food Trust, https://www.constellationr.com/node/17601/vote/application/view/588, Constellation Research Inc., pp. 1-4, 2010-2022.
Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.
Wyzant, https://web.archive.org/web/20190327185429/https://www.wyzant.com/hotitworks/students, Wyzant tutoring, pp. 1-13 , Mar. 27, 2019.

(56) References Cited

OTHER PUBLICATIONS

PCT International Search Report and Written Opinion; PCT/US2021/065855; dated Mar. 29, 2022.
PCT International Search Report and Written Opinion; PCT/US2022/012717; dated Mar. 30, 2022.
Peters, et al.; Student Support Services for Online Learning Re-Imagined and Re-Invigorated: Then, Now and What's to Come; Contact North | Contact Nord; Sep. 2017.
PCT International Search Report and Written Opinion; PCT/US2022/027077; dated Nov. 1, 2022.
Little, T.D., et al., On the Joys of Missing Data, Journal of pediatric psychology, 2014, pp. 151-162.
Honaker, J., et al., What to do About Missing Values in Time-Series Cross-Section Data, American Journal of Political Science, Sep. 6, 2008, pp. 561-581.
Westerhoff, Market Depth and Price Dynamics: A Note, University of Osnabrueck, Department of Economics Rolandstrasse 8, D-49069 Osnabrueck, German, Mar. 30, 2004, pp. 1-8.
PCT International Search Report and Written Opinion; PCTUS2022/051998; dated Mar. 8, 2023.
EP23153137.7 European Search Report, dated May 24, 2023, pp. 1-10.
EP20787830.7 European Search Report, dated May 12, 2023, pp. 1-10.
Zheyong, Bian, et al., "Planning the Ridesharing Route for the First-Mile Service Linking to Railway Passenger Transportation," Joint Rail Conference, Apr. 2017, pp. 1-11.
EP23168879.7 European Search Report, dated Jul. 5, 2023, pp. 1-13.
Ramasubramanian, Vasant, "Quadrasense: Immersive UAV-based cross-reality environmental sensor networks," phD diss., Massachusetts Institute of Technology, pp. 1-75, 2015.
Zhao, et al., Incentives in Ridesharing with Deficit Control, Proceedings of the 13th International Conference on Autonomous Agents and Multiagent Systems (AAMAS 2014), May 5-9, 2014, pp. 1021-1028.
Li, Jundong, et al., "Multi-network Embedding", pp. 1-9, 2018.
Papa, U., & Del Core, G., "Design of Sonar Sensor Model for Safe Landing of an UAV," IEEE Metrology for Aerospace, 2015, pp. 346-350.
Wei, et al. "impact of aircraft size and seat availability on airlines demand and market share in duopoly markets" Published by Elsevier, 2005, pp. 315-327.
PCT International Search Report and Written Opinion; PCT/US2022/052969; Mar. 21, 2023.
Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.
Freebeat, Smart Exercise Bike; retrieved from internet: https://www.amazon.com/Resistance-Cushioned-Detection-Altorithm-Instructors/dp/BOBZKKZ6B3/?th=1; Mar. 3, 2023; p. 1.
Aratani, Lori, "This app wants to reward you for smart commuting choices," The Washington Post, Aug. 18, 2018, pp. 1-3.
Yu, Haicong et al.; "A Multi-Modal Route Planning Approach with an Improved Genetic Algorithm", The International Archives of the Photogrammetry, Remote Sensing and Spaital Information Sciences, vol. 38, Part I, 2010.
"Node Influence Metric", Wikipedia, Nov. 6, 2020, pp. 1-5.
EP21916571 European Search Report, Jun. 18, 2024, pp. 1-9.

\* cited by examiner

1600

1610
At a mobile or fixed compputing device with a touchscreen or a computing device without a touchscreen or augmented mixed reality non-screen display or audio interface, detect user network login with facial recognition, fingerprint recognition for photo scan security

1620
GUI detects and receives origin from user inpout or current GPS coordinate and detects destination from user input and transmission

1630
Generate and apply one or more optimization techniques to form a virtual hub or virtual hub sequence with other user that have similar transportation requests within a geopraphic boundary

1640
Generate instructions for a plurality of computing devices, network, virtual hub database server, gaming server, map, server, network member database server and transportation forward market database server to form a combination of virtual hubs and contract specifications for delivery of transportation services or capacity between the virtual hubs in a format presented by a graphical user interface which allows users to enter forward physical prices to sell (offer) or bid (buy) transportation of freight capacity units between virtual hub combinations

1650
Generate instructions to interface a plurality of networks, global positioning systems networks, navigation servers, game server, forward commodity markets, grouping software for virtual hubs, transparent open access pricing systems, blockchain audit and safety systems, virtual hub servers and systems, no arbitrage constraint condition systems which form one system to implement a forward commmmodity transportation or freight capacity unit market system and method.

FIG. 16

MARKET EXCHANGE FOR TRANSPORTATION CAPACITY IN TRANSPORTATION VEHICLES

BACKGROUND OF THE INVENTION

Field of the Invention

Disclosed herein are implementations of various methods and systems of a network and commodity exchange to transact and trade transportation seats or capacity units in airline transport, subway transport, train transport, automobile transport, autonomous vehicle transport, taxi transport, space transport, virtual transport, underground transport, ship or sea transport, or drone transport on a computer, mobile computer device, virtual reality computer device or mixed reality computing device. Implementations of methods will occur in various modules considering, but not limited to, all forms of transportation and movement of freight. Transportation systems have generally assumed transportation is a personalized good rather than a commodity which is substitutable. In the United States, 85% of all vehicles ride with a single passenger in the vehicle, which is a tremendously inefficient use of energy and causes high levels of traffic congestion. While carpools have existed for many decades, they are largely not utilized by a majority of the population because the time involved to coordinate schedules outweighs the benefit of cost savings and reduced energy use. Mobile networks have allowed for the rise of transportation service companies that promote the use of pooling and hired drivers, but the cost of these systems has continued to be expensive for the majority of the public, which has held back wide scale adoption. Further, transportation companies have created systems which allow the company to set the prices of transportation capacity rather than a transparent marketplace. The implementation of the methods and systems disclosed herein creates an open and transparent market, which forces the lowest cost solution to dominate the market since all participants have equal access to the market exchange for transportation capacity units. It is a known fact that transparent open access markets create the lowest price for a good or service with fungible characteristics. The lowest cost and most efficient solution will greatly reduce pollution, increase transportation capacity utilization rates, reduce traffic congestion, and save consumers of transportation services trillions in cost by increasing utilization rates. An open access transparent system for trading transportation capacity will also ensure that new technologies, such as autonomous cars, do not become elitist and are only reserved for the wealthy and do not actually add to pollution and congestion problems as New York City has seen with networked transportation companies. Transportation is currently one of the most inefficient markets in the world, and a transportation exchange for transportation capacity units will bring market discipline and low-cost commodity pricing to all classes and forms of transportation capacity and services.

The current economic system and global network generally assumes that the economic choice with the highest level of utility and highest level of efficiency is one governed by acting in self-interest with competition. Modern economic game theory suggests that the former assumption can be improved not by acting in self-interest in an atmosphere of competition, but by also considering the economic outcome for the group as well as self-interest. In the specific economic case of transportation, there is no market to make transparent the economic cost of not valuing transportation capacity down to the commodity unit level. Because the market for transportation is generally valued at the whole vehicle level, tremendous inefficiencies exist. These inefficiencies are for the benefit of large fuel companies, large auto companies, and large transportation companies, and they are at the expense of the consumer who must buy more transportation than they need because there is no market for smaller units. Accordingly, inefficient choices are made which waste a great deal of energy and time. Most participants in the current economic system simply do not know how their choices affect others in the system, especially that choices in the developed world may affect disproportionately the outcomes for those in the undeveloped world or the wealthy compared to those with fewer resources. The current system is not linked, and, therefore, sub-optimal economic outcomes are achieved because there are limited governing mechanisms to consider the global group outcome. A transparent open access system and method for trading transportation units solves these inefficiencies by placing the discipline of a market to the poorly utilized excesses.

Further making the argument for this new and novel method and system, as disclosed herein, to valuing transportation capacity, are the example of large public subway systems in New York City, Paris, or London, as a few examples. In these metropolitan markets, people of all ethnicities, all sex types, and all income levels ride the public subway system. In these markets, each consumer buys an individual seat, and they then are allowed to sit in any seat. However, there is no designation of where they sit, only that they are given a space on the transportation method. The aforementioned example is evidence that seats are interchangeable and that they indeed fit the definition of a fungible commodity, which is one of the many bases and premises for the proposed new and novel invention. It is widely known that products which fit the definition of a commodity are most efficiently priced in transparent commodity markets, and commodity exchanges have been set up for those products, such as oil, power, natural gas, foreign exchange, gold, silver, wheat, and many other products. Even though the basis of a fungible commodity product definition is met through the example of a public subway system, the subway market continues to exist as a fixed price market set by the local transportation authorities. Again, the public subway system could be further improved by allowing a variable transparent market system to be added to the subway systems of the world. No such commodity trading market has existed for transportation units because the solution to integrate the technical requirements are complex and novel. The method and system of the transportation capacity exchange of the new and novel invention of this patent document solves the complicated market problem and provides the most efficient system and market based solution to pricing transportation in such a way that the global consumer will save money by using market pricing, methods, and systems as disclosed herein to fully utilize all market transportation capacity to the fullest extent possible. Because a market is setting the price of the methods and systems of the aforementioned novel invention, rather than a company, the solution is the most elegant and mathematically efficient answer for the global economy.

City planners across the globe discuss the field of shared-use mobility, which encompasses transportation services that are shared among users, including: public transit; taxis and limos; bikesharing, carsharing (round-trip, one-way, and personal vehicle sharing); ridesharing (car-pooling, van-pooling); ridesourcing; ride-splitting; scooter sharing;

shuttle services; neighborhood jitneys; and commercial delivery vehicles providing flexible goods movement. It is the use of any combination of shared mobility services, as described above, that have the effect of improving options to travel without a vehicle. Yet, in all these plans and studies, there has never been a proposal to integrate the power of a transparent marketplace to transportation capacity, which elegantly combines technology to make the concept feasible with market mechanisms and methods. The key to motivate the move to shared-use mobility is to integrate a commodity market to trade the individual value of a single unit of capacity, which has not been done by any other prior art or patent globally and has not been practiced by any business. The novelty of the method and system is to combine the technology of commodity markets with global positioning system ("GPS") location services and defining transportation as hub to hub capacity, as has been accomplished in energy markets among other methods and systems. Ample market participants actively and physically participate in hub-to-hub transportation already, and the unitized capacity of transport is a tradable commodity if the systems and methods exist to trade and price the market in such a manner.

Similarly, a highly publicized New York City study found that the services provided by transportation network companies (TNCs) created a net increase of 600 million vehicle miles traveled in New York City during 2016, which was a three to four percent increase in traffic citywide. Accordingly, the method and systems of the prior art are actually making city congestion problems worse, not better. While governments suggest effective policy leading towards shared—use vehicles and services, and away from single occupancy uses, much more is needed to prevent worsening congestion. Instead, a much simpler solution is to utilize an open access transparent marketplace for virtual hub to virtual hub transportation capacity, such as is accomplished in the contents of this patent document and novel invention. The solution is therefore fundamentally different, novel, and unique compared to the models and patents pursued by TNCs.

Using methods and systems of a transparent virtual hub to virtual hub market for transportation capacity to promote shared-use practices will have the immediate benefits of taking drivers off the road and reducing congestion, greenhouse gas emissions, and household transportation costs, even without the benefit of electric and autonomous vehicles, thereby offering a more immediate way to shape the future with affordable, accessible, and equitable multimodal options. Cultivating shared mobility practices now is important to start the behavioral shift towards a shared, electric, and autonomous vehicle future.

Shared-use vehicle technology is already here and is advancing, but it has been a slow process because there has yet to be an open access transportation marketplace or exchange to make transparent the price of a single unit of transportation capacity. The proposed technology may be utilized with a range of services, such as: a public transportation service as the backbone of the transportation network; individual shared services that can provide first and last mile options; or multi-passenger "micro-transit" options operated in areas where high-capacity transit is not feasible. Another way to view the contents of this patent is that the method and system will have the effect of creating a virtual hub to virtual hub subway (using various transportation types) in every city throughout the world through multiple methods of transportation. The alternative or status quo has led to urban planning infrastructure expenses that are skyrocketing, congestion that has become unmanageable in most urban areas, escalating pollution and resulting health care costs, increased vehicular deaths from congestion, and excessive costs at the consumer level, which can be reduced significantly. The patent invention method and system creates harnesses program instructions so that a market force can bring these benefits in a way that clearly has been unobtainable in the past through other methods and inventions. If another system and method were solving these problems, then there would be clear evidence as a counter-example in the market. However, no such evidence exists. In fact, evidence suggests all of these aforementioned problems have escalated with alternative inventions that have been patented and moved forward in business models for the marketplace.

Description of the Related Art

The following descriptions and examples are not admitted to be prior art by virtue of their inclusion within this section.

The current implementations of methods to use networks and computer systems to carpool are generally governed by single companies that set the price using non-transparent mechanisms. Further, most implementations of methods do not allow price discovery between various sellers and buyers of transportation because the systems are disparate and are not open access or transparent. The majority of mobile method and system transportation services utilize mobile technology, GPS, and system algorithms to manage transportation as a service, which is fundamentally different than viewing transportation as a commodity and as a commodity market, which the proposed system and method accomplish. Competing methods price transportation as a service, with the consumer buying multiple units with no transparent marketplace governing price competition for a single unit along a hub to hub route. Additional competing implementations of methods do not allow for forward selling or forward purchasing of transportation seats or capacity beyond a single transaction, which a commodity forward market allows through the systems and methods. An open and transparent market allows for large increases in price discovery and by economic theory results in the lowest possible price for consumers. City planners from New York to Austin to San Francisco to Paris to Mumbai to Tokyo to Beijing to Sao Paulo or Johannesburg all struggle to see how the future options of transportation will shape city planning. City planners have large concerns that, when markets move to autonomous cars, cities will still have massive congestion problems if people continue to ride as a single passenger in one car. Accordingly, the proposed novel invention allows for significant new product offerings and much higher utilization rates by redefining the market into unitized commodity units in transportation capacity markets and providing the technology methods and systems to accomplish the goal of higher efficiency and lower consumer pricing for transportation units.

Implementations of methods have been made in systems that provide transportation on demand through technology methods and systems, but none frame the problem as a forward commodity market or a unitized capacity market with simple elegant systems and methods that allow the natural forces of supply and demand to set the price through a universally transparent medium, such as a transportation capacity exchange. Additionally, no prior art system or method proposes a technically capable solution of integrating the technical software and hardware requirements for integrating the tasks of a network, GPS system, mobile computing devices, servers, forward commodity exchanges, grouping software for hubs, transparent open access pricing systems, blockchain audit and safety methods and systems, virtual hub systems, or algorithms for no arbitrage conditions in a simple, easy-to-use graphical user interface format for mobile or virtual computing over various mediums that are connected via a network.

1) U.S. Pat. No. 6,356,838 issued Mar. 12, 2002 to Sunil Paul discloses a method, system and program for determining an efficient transportation route. The prior art relates to a computer-implemented method is described for determining an efficient transportation route comprising: compiling travel data over one or more travel segments, the travel data transmitted from one or more transportation vehicles traveling over the travel segments; receiving positional data associated with a transportation request, the positional data including an origin and a destination; and providing a driver of a vehicle with a first efficient route from the origin to the destination using the travel data, the first efficient route including one or more of the travel segments. Also described is a computer-implemented method for providing transportation services comprising: receiving a transportation request from a passenger; tracking the passengers position following the request using positional detection logic; and transmitting positional data identifying the passengers position to a pickup vehicle. The prior art patent is widely cited as the business model taken by most mobile application based transportation services companies. While the prior art does describe the service model of the current construct of the market for transportation with a custom on demand service and then a corresponding company delivering that service through both the technology and the actual physical transportation, it defines a completely different market scenario than a virtual hub to virtual hub transportation transparent market exchange for an individual transportation capacity unit. As previously discussed, a commodity based transportation capacity unit market has a completely different market construct than is defined by all operators and patents in the space. The prior art is simply matching transportation requests through a series of servers, GPS systems, and mobile devices. The prior art clearly was a novel invention, but as evidenced by the market, the method has been utilized to replace the inefficient taxi model rather than create a marketplace for transportation units that can be priced as a commodity with specific commodity contract specifications and the discipline a market brings to a business problem to fill up unutilized transportation capacity through the efficient mechanism of price. It is very clear the result of the methods and systems of the prior art has contributed to increased congestion and traffic unlike the proposed methods and systems. In a commodity based transportation capacity system with open access transparent systems and methods, the price will continue to go lower until all space has been utilized or supply for the transportation units is equal to the demand for transportation units. As any observer with ordinary skill would see, most transportation unit seats or capacity goes unutilized, and this is a proof and counterexample that no such system is in existence and that the patents and prior art in this field do not address the present novel invention of bringing a commodity market to bear on the prices of individual units of transportation capacity between virtual hub to virtual hub routes. If prior art addressed the novel invention, then a marketplace would exist for transportation units of capacity which is open access and transparent and prices would drop until a level was reached where all transportation was fully utilized. The prior art simply makes the method of taxicab and private service cars more efficient and in fact adds to congestion as has been empirically documented by all cities across the world. By contrast the novel invention may use the method and system integrating the technical software and hardware requirements for integrating the tasks of a network, GPS system, mobile computing devices, servers, forward commodity exchanges, grouping software for hubs, transparent open access pricing systems, blockchain audit and safety methods and systems, virtual hub systems, algorithms for no arbitrage conditions in a simple easy to use graphical user interface format for mobile or virtual computing over various mediums which are connected via a network.

2) U.S. Pat. No. 6,421,606 issued Jul. 16, 2002 to Asai et al., discloses a method and system for a route guiding apparatus and medium. The prior art specifically addresses a route guiding apparatus providing information fora route using public transportation as an alternative to a vehicular route. In addition to searching for a vehicular route from a current location to a destination, it is determined whether the current location and the destination are within a zone in which public transportation can be used. When the current location and the destination are determined to be within a public transportation zone, a route using public transportation is searched for. Subsequently, the cost of the route using public transportation and the cost of the vehicular route are compared. When the cost of the public transportation route falls within a predetermined limit, the apparatus indicates the public transportation route. The route costs are calculated considering factors such as required travel time and ticket fees. The apparatus may also recommend public transportation when no parking is available near the destination or based on traffic information concerning the vehicular route. The prior art clearly addresses a comparing function to determine the lowest cost route to move from one point to another point however the prior art is completely void of providing an open access transparent forward commodity market for individual capacity units to place the method of a market over the system which would then allow for dramatically lower and more efficient prices and utilization would increase dramatically as supply and demand forces would force the market to balance through price. Accordingly, the prior art is not comparable from a market method and system basis or from an efficiency basis. The novel invention by contrast integrates the technical software and hardware requirements for integrating the tasks of a network, GPS system, mobile computing devices, servers, forward commodity exchanges, grouping software for hubs, transparent open access pricing systems, blockchain audit and safety methods and systems, virtual hub systems, algorithms for no arbitrage conditions in a simple easy to use graphical user interface format for mobile or virtual computing over various mediums which are connected via a network.

3) U.S. Pat. No. 7,373,320 issued May 13, 2008 to Timothy Francis McDonough discloses a method and system for an invention relating to a futures exchange for services contracts. The SerFEx is an electronic market system that enables the exchange of cash (spot and forward) contracts and futures contracts for the delivery of services. Services are traded on the exchange similar to commodities on a prior art commodities exchange. The exchange allows the futures market to determine the right price for services for the producers and consumers of those services. Participants may buy, sell, or leverage services contracts through a variety of order types. The exchange is composed of an electronic infrastructure that has four major components: a front-end facility comprised of licensed authorized intermediaries, an automated bid/ask matching system, a clearinghouse system, and a title management system. The exchange operates twenty-four hours per day and seven days per week with all accounts settled at least once in every twenty-four hours. Participants in the exchange may be producers of services, intermediaries, speculators, and consumers of the services. The prior art very clearly calls the title and claims of the patent a contract futures exchange. A person with ordinary skill in the art would know there is a dramatic difference between a futures contract which are on regulated exchange and forward contracts which trade over the counter. Futures contracts are highly regulated by definition. There are specific legal differences between futures and forward contracts, and they cannot be confused or used interchangeably. As one of many examples, speculators are not permitted to trade forward contracts as all contracts must be transacted with a physical underlying ownership and must be physically delivered unlike regulated futures exchanges which permit speculators. For the sake of clarity, the transportation capacity exchange is exclusively limited to forward physical contracts which means that the contracts are limited to be traded by only those who are actually providing the underlying service or method. The prior art specifically mentions a data system method for implementing a service contract exchange for construction, transportation, warehousing, postal services, information, real estate, rental, leasing, financial, insurance, professional, scientific, technical services, management, administrative services, educational services, health care, social assistance arts, entertainment and recreation among others. Again, someone with ordinary skill would note the specific technical difference between a forward contract which is proposed and the prior art futures contract. As an important further technical difference to anyone with ordinary skill in the art, the prior art does not show mobile computers or GPS systems as part of the proposed futures exchange in any of the claims or as any part of any diagram and it would be clear this would be a necessary requirement to functionally allow for the delivery of futures or forward contracts for transportation. Therefore, the prior art method and system would be incapable of completing the novel invention proposed in this patent method and systems. FIGS. 9A and 9B of the prior art show that the primary art of the patent in question was a futures contract to sell a royalty escrow service contract which does not require GPS or mobile based technology to complete a transaction. Accordingly, the prior art would be disqualified from comparison very clearly to someone with ordinary skill based on the futures to forwards legal differences and the technical inability to complete a transportation capacity contract without mobile or GPS based technology outlined in any claim or figure of the patents. The prior art is limited to a regulated futures exchange which has a clearing house that guarantees the transactions through a highly regulated process. By contrast, forward contracts carry default risks. The prior art refers to mark to market contracts which are a hall mark of futures contracts whereas the novel invention forward transportation unit contracts are settled on one date at the end of the contract. The prior art is clearly limited to regulated futures with are heavily participated in by speculators who are betting on price directions and usually close out positions prior to maturity as evidenced by any regulated commodity futures trading commission data. The novel invention, by contrast, is a forward transportation capacity unit contract which is mainly used by hedgers and physical participants in the market to eliminate the volatility of an assets price and physical delivery usually takes place as would be the case for someone actually using or providing the transportation capacity unit. The prior art futures contracts are generally subject to one single regulatory regime as by definition they must be regulated by a single entity in one jurisdiction. The prior art is limited in the claims to futures which in the case of physical delivery, counterparties are chosen randomly by the exchange. By contrast, the novel invention of a forward transportation capacity unit specifies to whom the delivery should be made. The prior art claims limit are limited to futures where there are margin requirements and periodic margin calls by which cash may change hands daily. By contrast, the novel invention of a computer implemented forward commodity transportation capacity unit exchange, no cash flows until physical delivery takes place. By comparison, the novel invention may be transacted across jurisdictional boundaries and are primarily governed by the transactional relations between the parties. The prior art is a futures exchange for service contracts for royalties of many service products highlighting the service of transportation or transportation as a service which is not an actual physical fungible good such as a commodity like copper or coffee or oil which can have an associated futures contract. By contrast the novel invention is a fungible commodity forward contract of actual seat capacity or space capacity on a transportation capacity bearing unit. A service of the prior art would not be able to group users using a virtual hub pooling server which would then combine with another virtual hub or combination of hubs to make a tradable commodity unit, again therefore rendering the prior art as incapable of delivering the service. The novel invention by contrast integrates the technical software and hardware requirements for integrating the tasks of a network, GPS system, mobile computing devices, servers, forward commodity exchanges, grouping software for hubs, transparent open access pricing systems, blockchain audit and safety methods and systems, virtual hub systems, algorithms for no arbitrage conditions in a simple easy to use graphical user interface format for mobile or virtual computing over various mediums which are connected via a network. The prior art is technically incapable of providing the software or hardware that would allow for the completion of a transaction between two users in any of the claims. Lastly, the prior art of McDonough largely resembles the recent U.S. Supreme court decision in Alice Corp. v. CLS Bank International. The issue in the Alice case was whether certain claims about a computer-implemented, electronic escrow service for facilitating financial transactions covered abstract ideas ineligible for patent protection. The patents were held to be invalid, because the claims were drawn to an abstract idea and implementing those claims on a computer was not enough to transform that idea into patentable subject matter. It is very clear that the prior art of McDonough is dangerously close in spirit if not fully resembling the Alice decision as the patent is simply pushing forth the concept of using a financial exchange to cover a general abstract idea with very little evidence to support a novel invention of the actual structure of the market or a novel approach to how to make the physical market perform with either an escrow service contract futures exchange or a transportation service contract futures exchange. In this specific case, the Supreme court gave a two-step test which McDonough would follow the precedent of Alice in that they are simply borrowing the concept of a futures exchange without a novel technical method or system as to facilitating a transaction and as we clearly present in our arguments, the prior art could not facilitate a transportation futures contract implementation because there is no mobile technology to route riders which renders the implementation nonfeasible. Further there is no specific computer system or unique program which is novel in the implementation other than regurgitating back the business method of a prior art exchange and then applying it to the abstract concept of applying the existing prior art to service contracts. The novel system and methods of this patent specifically outline the implementation of integrating a novel interfacing of networks, GPS systems, mobile computing devices, services, forward commodity exchanges, grouping software for hubs, transparent open access pricing systems, virtual hubs, no arbitrage conditions alongside a novel graphical user interface that combines all these systems and methods for forward transportation contracts. Clearly the current patent (unlike McDonough), adds "something extra" that embodies and "innovative concept" and is not generic, conventional or obvious as no other patent or business offers these novel concepts.

4) U.S. Pat. No. 7,756,633 issued Jul. 13, 2010 to Huang et al., discloses a method and system for a comprehensive security-enhanced rideshare system is provided. The rideshare program includes localization, mapping and ride matching for participants. Participation incentives and revenue methods provide for the financial viability of the rideshare system. Participant security is monitored in near real-time using location-determining communication devices used by the participants in the system. The rideshare system monitors a number of security-indicating criteria and acts when an anomalous condition is recognized. The method claim of the prior art specifically refers to providing security in a rideshare environment and monitoring that participant to look for anomalies during the travel route or travel times by a pre-defined threshold and sending security alerts to be confirmed by the rideshare participant that indeed they are safe. The novel invention is fundamentally different than the prior art as the blockchain technology for security within the forward transportation capacity market relies upon algorithms which include independent comprehensive background checks of participants combined algorithms which alert towards the actual commodity unit of the transportation capacity unit not being delivered as per the forward contract specifications in the agreement.

5) U.S. Pat. No. 8,121,780 issued Feb. 21, 2012 to Gerdes et al. discloses a method for offering a user reward based on a chosen navigation route includes calculating alternative routes from a starting location to a destination location by taking into consideration route segments including public transportation route segments and road network route segments. The alternative routes are presented to a user. A reward is offered for choosing a respective one of the routes. A navigation system that performs the route calculation preferably queries a network database for public transportation information. The prior art in concept is similar to the Paul et al, US Patent application No 2015/0248689 wherein the user of the system and method are given a reward or incentive for choosing a route which in theory promotes the concept of transportation pooling or the use of public transportation. The clear differences again are that the prior art is not a forward based transportation capacity exchange which will drive the transportation capacity price to the lowest possible economic level. Accordingly, the prior art does not necessarily lead to the most efficient outcome. The forward commodity individual unit transparent open access forward exchange is required to arrive at the most efficient lowest price outcome in the limit and therefore the proposed invention uses methods and systems to come to a superior solution and is therefore fundamentally different and unique. The novel invention by contrast integrates the technical software and hardware requirements for integrating the tasks of a network, GPS system, mobile computing devices, servers, forward commodity exchanges, grouping software for hubs, transparent open access pricing systems, blockchain audit and safety methods and systems, virtual hub systems, algorithms for no arbitrage conditions in a simple easy to use graphical user interface format for mobile or virtual computing over various mediums which are connected via a network.

6) U.S. Pat. No. 8,762,035 issued Jun. 24, 2014 to Uri Levine et al., discloses a method and system for real-time community information exchange for a traffic mapping service for allowing plurality of users having each a navigation device to transmit their locations to a server and optionally to signal to the server their requested destination. The system and method are further capable of calculating traffic parameters such as current traffic speed at a given road based on the momentary locations of the users. The system and method of the invention may also calculate and advise the users of preferred roads to take in order to arrive at the requested location with minimum delay. The prior art utilizes GPS systems and mobile devices to route people most efficiently from a starting point to an ending point utilizing a community of users. The prior art utilizes a community but has nothing to mention of an open access transparent trading exchange market for forward transportation capacity. Further the prior art is focused on the shortest mapping route for a transportation segment, not using a market to price the value of the individual capacity units along a given virtual hub to virtual hub route. The novel invention by contrast integrates the technical software and hardware requirements for integrating the tasks of a network, GPS system, mobile computing devices, servers, forward commodity exchanges, grouping software for hubs, transparent open access pricing systems, blockchain audit and safety methods and systems, virtual hub systems, algorithms for no arbitrage conditions in a simple easy to use graphical user interface format for mobile or virtual computing over various mediums which are connected via a network.

7) U.S. Pat. No. 8,798,593 issued Aug. 5, 2014 to Haney, discloses location sharing and tracking using mobile phones or other wireless devices. The prior art systems and methods provide a system for exchanging GPS or other position data between wireless devices for purposes of group activities, child location monitoring, work group coordination, dispatching of employees etc. Cell phones and other wireless devices with GPS receivers have loaded therein a Buddy Watch application and a TalkControl application. The Buddy Watch application communicates with the GPS receiver and other wireless devices operated by buddies registered in the user's phone as part of buddy groups or individually. GPS position data and historical GPS position data can be exchanged between cell phones of buddies and instant buddies such as tow truck drivers via a buddy watch server. Referencing the Alice Corp. v. CLS Bank International decision, the prior art generally falls under the category of an abstract concept of grouping people using GPS which is not a novel concept or method beyond a general business method from prior art without specific application. Further, the prior art would struggle to stand the light of Alice additionally considering Bilski v. Kappos that the idea of grouping people with GPS is an abstract idea and does not apply to a specific novel example of transportation, transportation as a commodity, unique transportation contract specifications, uniquely defining transportation capacity as seats or cargo space, transportation to define a virtual or actual hub in the context of a forward contract exchange for transportation.

8) U.S. Patent Application No. US 2015/0248689 with publication date of Sep. 3, 2015 to Sunil Paul et al., discloses a method and system for providing transportation discounts. The prior art systems and methods for providing transportation discounts are disclosed as a server receives, from a client device of a user, a request for a transportation service. In response, the server identifies that the request relates to a particular characteristic associated with modified pricing. The server then calculates an adjusted price for the transportation service based on the modified pricing associated with the particular characteristic. As we have reviewed in the background section of this patent application the proposed system and method uses proprietary information for a company to price a transportation discount which is non-transparent, and the company assigned the patent uses its technology to price the discount rather than an open transparent market such as a commodity market for transportation capacity. The Paul et al. patent application refers to a ride request in FIG. 7, which prices a discount for a ride option based on longer wait time and fewer pick-ups as a proposed example. In this example, the ride request and the market are not for an individual unit of transportation capacity and the example is not an open access market exchange for the individual units of transportation. Individual custom rides are not commodities which has been why the transportation market has not been able to get to the result that we propose. In a hub to hub based system, there would be enough liquidity and participants to create a viable marketplace of substitutable transportation capacity. A hub to hub transportation model will generally leave the last mile of transportation to another system or method such as the method of a custom transportation request. A commodity market for transportation capacity is only viable where there is ample liquidity for substitution. The proposed method and system of Paul et al. is fundamentally different and more akin to the current methods and systems currently available through companies such as Uber, Lyft, Grab, or Via. Paul et al., in FIG. 8, proposes an electronic bulletin board for matching custom requests, but clearly do not function as a commodity exchange with defined commodity delivery points, product specifications, penalties for non-performance, etc., as are standard in commodity contracts for well-known alternative products, such as wheat, corn, natural gas, power, oil, etc. Further, FIG. 9 proposed by Paul et al. shows a cross promotional package approach to transportation and theater or dinner shows which defeats the purpose of defining transportation units as a commodity unit which will bear the lowest cost and provide the highest economic incentive for usage. FIG. 12 from Paul et al. describes a method and system for using user profile history data to generate discounts which by definition are set by the system. This is fundamentally different from setting a price by an open access market where any participant can offer any price at any time for a given hub to hub route. No system or company controls the pricing and the market is left free to float, which is different from the system and method of Paul et al., which has a transportation server price and the transportation request for some hot spot location. Further, Paul et al. suggests some embodiments are defined from a sponsor giving a transportation discount to a particular location as a promotion. A commodity market eliminates custom behavior and treats a transportation unit for a specific product as uniform without special characteristics such as are proposed by Paul et al. The novel invention by contrast integrates the technical software and hardware requirements for integrating the tasks of a network, GPS system, mobile computing devices, servers, forward commodity exchanges, grouping software for virtual hubs, transparent open access pricing systems, blockchain audit and safety methods and systems, virtual hub systems, and algorithms for no arbitrage conditions in a simple, easy-to-use graphical user interface format for mobile or virtual computing over various mediums which are connected via a network.

SUMMARY

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

The aforementioned deficiencies and other problems associated with the general transportation market, other novel systems and interfaces, and how transportation functions with large inefficiencies, which use electronic devices to hail taxicabs or carpooling services, are reduced or eliminated by the disclosed method and system of integrating and interfacing a plurality of systems into one system, which allows the efficiency of a market to price and ration unused spaced as to eliminate wasted seats or capacity. In some embodiments, the methods and systems are on portable devices. In some embodiments, the methods and systems are on stationary devices. In yet other embodiments, the methods and system disclosed may use mixed reality, augmented reality, virtual reality, or other visualization methods to allow a user to transact and trade transportation capacity as a forward commodity. In some embodiments, the graphical user interface ("GUI") on any mobile or stationary computer device interfaces with one or more processors, memory, and one or more modules, programs, or sets of instructions stored in the memory for performing multiple functions. In some embodiments, the user interacts with the GUI primarily through finger contacts, voice commands, or other sensory methods to interface with the GUI. In some embodiments, the functions may include the user directing the GUI to place a user profile in a virtual hub so that they may participate, transact, or trade a combination of virtual hub transportation routes as a forward commodity for transportation capacity. In some embodiments, the functions may include the user instructing the GUI to participate, transact, or trade various modes of transportation capacity, such as automobile, air, autonomous vehicle, bike, boat, bus, drone, limo, motorcycle, moped, shuttle, space, subway, taxi, train, other transportation methods, cargo, packages, virtual or various combinations of the aforementioned modes. In some embodiments, the functions may include the user instructing the GUI to form a new or existing virtual hub, or virtual hub combination, which then has a specification function that forms a basis for the GUI to present the plurality of buyers and sellers of transportation capacity between two or more virtual hubs.

In an aspect of the invention, a computer-implemented method for use in conjunction with a computing device with various display formats comprises: a user at a mobile or fixed computing device with a touchscreen, a computing device without a touchscreen, or an augmented reality non-screen display, detecting a user network login, detecting and receiving from the user through the GUI user input or GPS coordinate input from the computing device, detecting from the user input a destination coordinate and transmission of said coordinates, generating and applying one or more optimization techniques to form a virtual hub with other users that have similar transportation requests within a geographic boundary, generating instructions for a plurality of computing devices, networks, virtual hub database servers, network member database servers, transportation exchange database servers to form a combination of virtual hubs and contract specifications for delivery of transportation services or capacity between the virtual hubs in a format presented by a GUI, which allows the user to submit prices to sell (offer) or bid (buy) transportation capacity between virtual hub combinations, and generating instructions to interface a plurality networks, global positioning systems networks, servers, forward commodity exchanges, grouping software for virtual hubs, transparent open access pricing systems, blockchain audit and safety systems, virtual hub servers and systems, and no arbitrage constraint condition systems, which form one system to implement a forward commodity transportation capacity unit exchange system and method. The programs and instructions are stored in memory and configured to be executed by one or more processes by a plurality of users. The programs may include a plurality of configurations and specification instructions for various modes of transportation capacity. The programs also may include specification options to select a plurality of timings, quality levels of capacity and service, term of timings, such as by the second, minute, hour, day, weekday, weekend, month, annual, or day of the week, various order types such as day, good till cancelled, immediate or cancel, good till date, day till cancelled, limit, market, market if touched, snap market, snap mid, snap to primary, peg to benchmark, and adaptive custom orders. The programs may also include a plurality of instruction modes, such as automobile, air, autonomous vehicle, bike, boat, bus, drone, limo, motorcycle, moped, shuttle, space, subway, taxi, train, packages, and cargo for transportation capacity. The programs also may include instructions for virtual hub pick up and drop off points, as well as instructions to set various constraints, such as cheapest route, single mode, multimode, fastest route, most scenic route, highest rating, most available or liquid, highest volume, most frequent, and service level. The programs and instructions from the GUI provide master instructions for the plurality of computing devices and servers that interface to allow the user to participate, transact, and trade a plurality of transportation capacity modes between a plurality of virtual hubs.

In another aspect of the invention, a computing system comprises: a plurality of networks, global positioning systems networks, servers, forward commodity exchange servers and instructions, grouping program instructions for virtual hubs and associated servers, transparent open access pricing servers and instructions, blockchain audit and safety servers and instructions, virtual hub servers and instructions, and no arbitrage constraint condition servers and instructions, which form one system to implement a forward commodity transportation capacity unit exchange system and method.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 16 is a flow diagram illustrating methods exemplary users move through while participating, transacting and trading transportation capacity in accordance with some embodiments.

DETAILED DESCRIPTION

Figure 1:
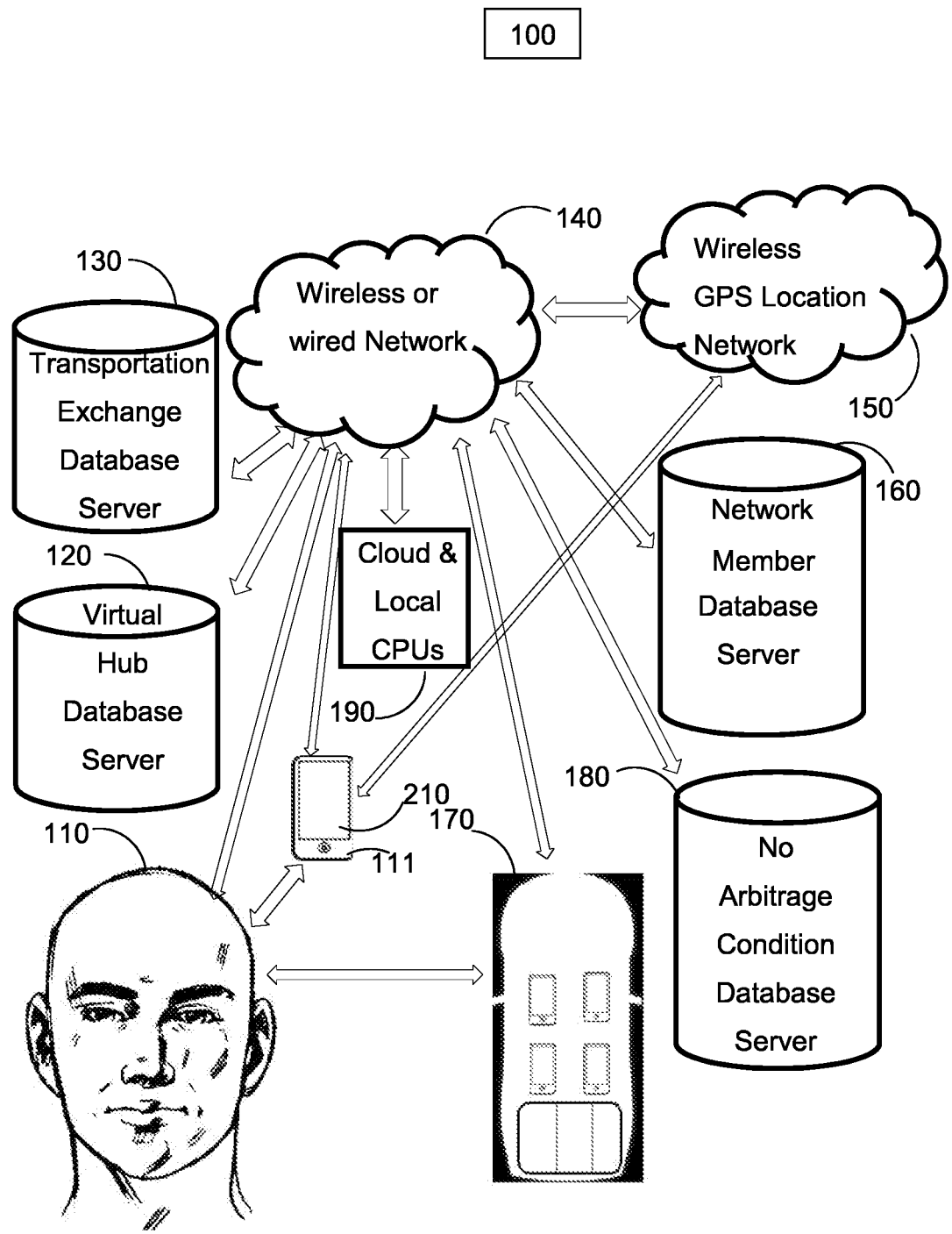
FIG. 1 illustrates a schematic diagram of the network configuration and implementations of methods which support the method and system of trading transportation capacity in accordance with some embodiments.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade and transact transportation as a physical forward commodity. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a", "an" and "the" are intended to also include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a mobile computing device may be substituted for a fixed stationary computing device, a virtual reality headset, a mixed reality headset, or an augmented reality headset. Embodiments may also occur on a projection computing device or in any other method or system which communicates and integrates the use of a network, global positioning system network, mobile computing devices, servers, forward commodity exchanges, grouping software instructions for hubs, virtual hub methods and systems, transparent open access user interface pricing systems, blockchain audit and safety methods, or algorithms for no arbitrage conditions and constraints with a user interface or graphical user interface formatted on mobile or stationary computing devices over various mediums that are connected through a network for the purpose of participating, transacting, or trading transportation capacity units between combinations of virtual hubs as a forward commodity.

Figure 2:
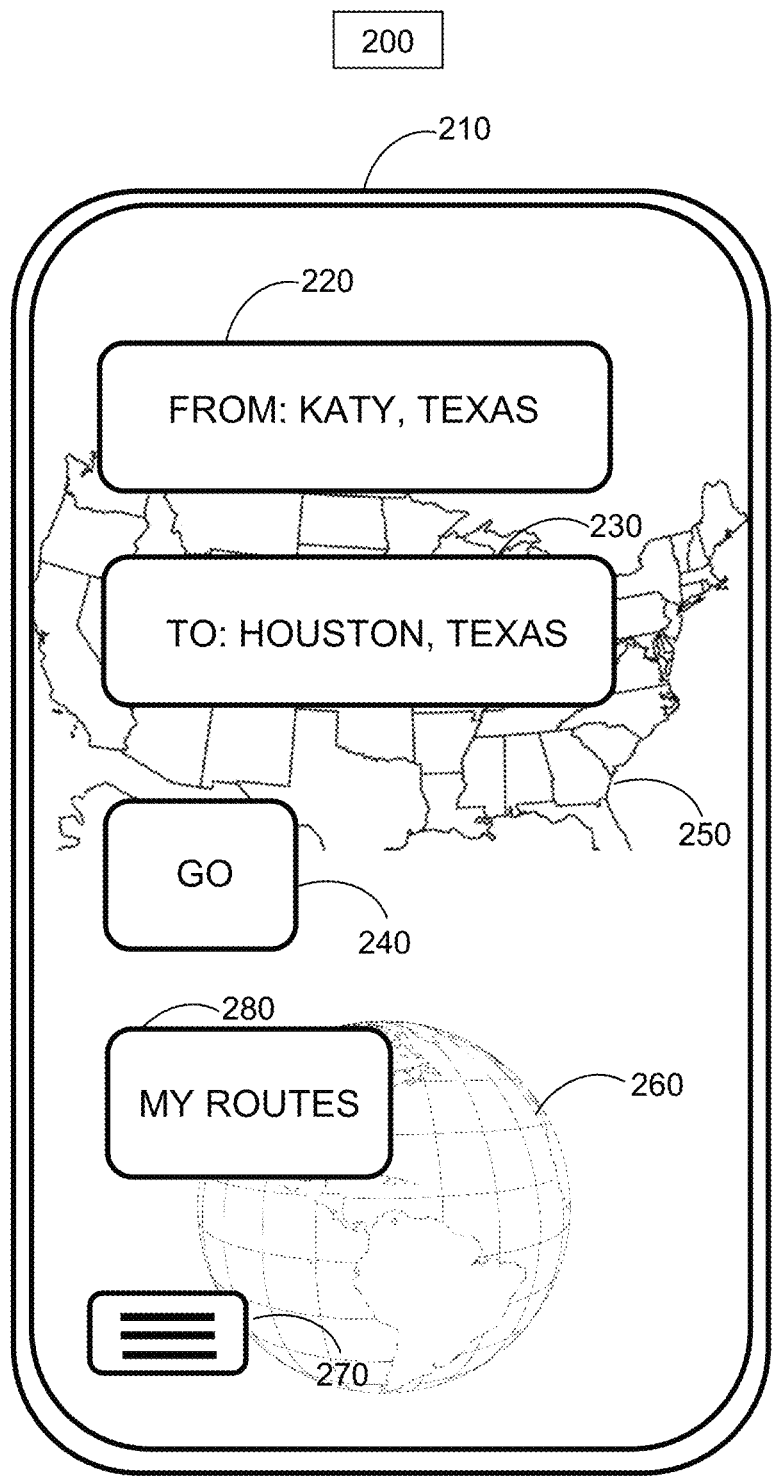
FIG. 2 illustrates an exemplary user interface to configure the origin and destination for a virtual hub to trade transportation capacity in accordance with some embodiments.

The following paragraphs provide various techniques of various embodiments described herein such as illustrated as in FIG. 1. In one implementation as illustrated in FIG. 1, a user 110 may use a mobile computing device 111 to login through a network 140 to a network member database server 160. The mobile computing device 111 may be substituted for a fixed stationary computing device, an augmented reality projection device, virtual reality projection device, mixed reality projection device, or any computing device which renders a visualization to a user 110. Once the user 110 has logged into the network member database server 160 through the wireless or wired network 140, a token will be passed to the mobile computing device 111 and an authenticated session commences, which allows the user 110 access to an exemplary graphical user interface 210, as shown in FIG. 2. The user 110 may input an origin/from location 220 and a destination/to location 230 on the mobile computing device GUI 210. The user 110 may also allow the instructions from the GUI on the mobile computing device 111 to locate the user's origin/from address automatically through communication with the wireless GPS location network 150. The user 110 may transmit the from/origin address location 220 and to/destination address location information 230 by depressing the go representation 240 on the GUI. The from/origin address location 220 and to/destination address location information 230 are transmitted by the user 110 to the wireless or wired network 140 to a cloud based CPU 190 or a local CPU 190, such that instructions may be performed in the memory of the CPU 190 to form a virtual hub 310 with other users 110 that are part of the network member database server 160. The virtual hub location information is then saved in the virtual hub database server 120 by the CPUs 190 transmitting the corresponding data to the virtual hub database server 120. Once two or more virtual hubs have been logged into the virtual hub database server 120 with corresponding physical location data, the instructions on the CPU 190 request the corresponding pricing information from the transportation exchange database server 130 through the network 140 to present the current series of bid/buy and offer/sell prices for the combination of virtual hubs the user 110 has requested. The user 110 may set a series of conditions and constraints to give specific instructions to the CPU 190 through the mobile computing device GUI 210. The specific conditions and constraints set by the user 110 form the basis for the forward commodity contract between other users 110 on the network member database server 160 which form the basis for participating, transacting, and/or trading transportation capacity as a forward commodity. Further, the user 110 may set additional constraints on the mobile computing device GUI 210, which then are transmitted through the network 140 to the no arbitrage condition database server 180 such that the commodity transaction may have important attributes which assist in increasing the liquidity of various transactions on the system. Once a transaction has been completed using the plurality of CPUs, instructions, servers and networks, the user 110 may then physically take delivery of the transportation capacity commodity by getting into the vehicle 170 and taking a unit of capacity as defined by the contract commodity specifications which were set by the user 110 using the mobile computing device 111, network 140, a plurality of database servers such as the transportation database server 130, CPUs 190, instructions on CPUs 190, virtual hub database server 120, wireless GPS location network 150, network member database server 160, and no arbitrage condition database server 180. Further, a user 110 may not only take physical delivery of the transportation capacity unit in a vehicle 170, but they may also make physical delivery of the transportation capacity unit if the user 110 is the owner of the transportation capacity unit. If the user 110 is the buyer of the transportation capacity unit, they are taking physical delivery of the transportation capacity unit in the vehicle 170. To avoid confusion, the specifications for the transportation capacity unit mode may have been set for automobile, air, autonomous vehicle, bike, boat, bus, drone, limo, motorcycle, moped, shuttle, space, subway, taxi, train, fastest optimized, cheapest route, packages, cargo, or virtual modes. Accordingly, the vehicle 170 in the diagram in FIG. 1 may be an automobile, air, autonomous vehicle, bike, boat, bus, drone, limo, motorcycle, moped, shuttle, space, subway, taxi, train, fastest optimized, cheapest route, packages, cargo, virtual, or other form of transportation. To be approved as a network member on the network member database server 160, the user 110 must have input financial information into the network member database server 160, such that the user 110 has the ability to take payment for delivery of the transportation unit commodity or make payment for the transportation unit commodity. Safety and security also have preset configurations and approval levels for network members in the network member database server 160 and no arbitrage condition database server 180 which are covered in more detail later in the drawings and detailed description. Virtual hub database server 120 locations are added as a user 110 requests transportation capacity units or offers transportation capacity units from various locations from the GUI 210 on the mobile computing device 111.

FIG. 2 illustrates, in some embodiments, exemplary user interfaces 210. In some embodiments, the user 110 may select one or more of the user interface elements to enter an origin/from address 220 and a destination/to address 230 as well as having the GPS network 150 autofill the origin location 220 from the user's 110 present location. The mobile computing device 111 may be substituted for a fixed stationary computing device, an augmented reality projection device, virtual reality projection device, mixed reality projection device, or any computing device which renders a visualization to a user 110 for the purpose of displaying the transportation capacity unit trading exchange GUI 210. In some embodiments, the user 110 may select the go button 240 after the origin/from address 220 and a destination/to address 230 have been input. In some embodiments, the GUI 210 may have a background map 250 relative to the location of the user 110. In some embodiments, the user 110 may scroll to a world location using the world icon 260. In some embodiments, the user 110 may select the "my routes" button 280, which may show the user's 110 most frequent transportation capacity combinations so that the user can easily navigate to the most relevant transportation capacity markets. As an example, but not limited by the example, the user 110 may have entered routes in the "my routes" 280 saved locations on the virtual hub database server 120, transportation exchange database server 130, and network member database server 160, where such routes may include "home to work", "work to home", "work to gym", "gym to work", "work to shopping", "shopping to work", "home to friend", "home to school", "home to downtown", "downtown to home", "home to shopping", "home to yoga", or a plurality of the most common routes for a user 110. The hamburger graphic button 270 may allow the user to set many additional settings to set the market constraints for participating, transacting, or trading forward transportation as a commodity. The hamburger graphic button 270 on the GUI 210 may also serve as a menu function for the application GUI instructions. As described previously, the hamburger graphic 270 may be used to navigate throughout the various settings of the GUI 210 for transportation capacity as a forward commodity by a user 110.

Figure 3:
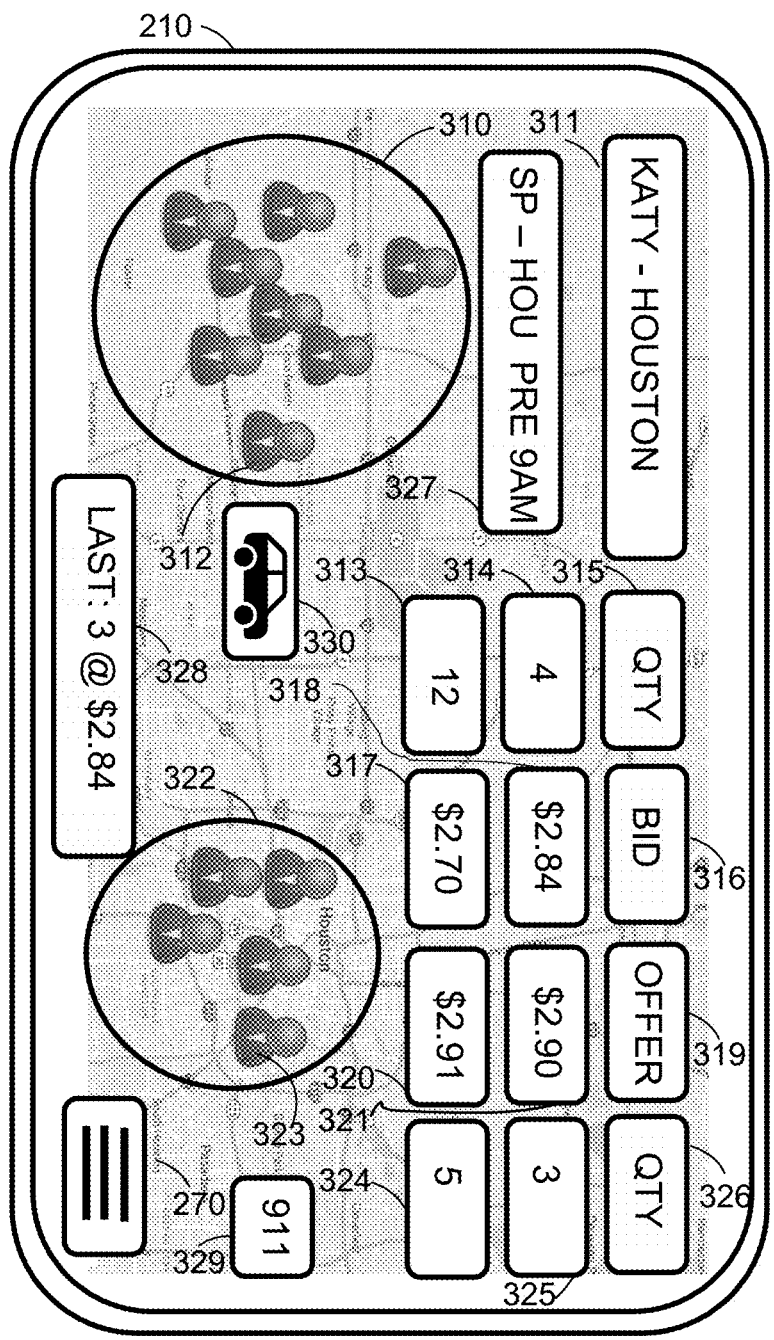
FIG. 3 illustrates exemplary user interfaces to transact and trade automobile transportation capacity with various domestic configurations in accordance with some embodiments.

FIG. 3 illustrates exemplary user interfaces 210 for participating, transacting, and/or trading transportation as a physical forward commodity between combinations of virtual hubs over various transportation modes. In some embodiments, user interface 210 includes the following elements, or a subset or superset thereof:

Exemplary virtual hub combination 311;

Exemplary virtual hub origin/from location 310 with users 312 within the virtual hub location 310;

Exemplary specification summary of the market, level of service and time of delivery commencement 327;

Exemplary mode of transportation capacity type 330;

Exemplary transaction summary of the last trades quantity and price 328;

Exemplary virtual hub destination/to location 322 and user who is being delivered on the transportation capacity unit 323;

Exemplary bid/buy quantity title header 315 for an exemplary virtual transportation hub market;

Exemplary bid/buy price title header 316 for an exemplary virtual transportation hub market;

Exemplary offer/sell price title header 319 for an exemplary virtual transportation hub market;

Exemplary offer/sell quantity title header 326 for an exemplary virtual transportation hub market;

Exemplary bid/buy quantity 314 for the best bid quantity from a plurality of users 110 for an exemplary respective transportation capacity virtual hub combination 311;

Exemplary bid/buy quantity 313 for the second-best bid quantity from a plurality of users 110 for an exemplary respective transportation capacity virtual hub combination 311;

Exemplary bid/buy price 318 for the best bid price from a plurality of users 110 for an exemplary respective transportation capacity virtual hub combination 311;

Exemplary bid/buy price 317 for the second-best bid price from a plurality of users 110 for an exemplary respective transportation capacity virtual hub combination 311;

Exemplary offer/sell price 321 for the best offer price from a plurality of users 110 for an exemplary respective transportation capacity virtual hub combination 311;

Exemplary offer/sell price 320 for the second-best offer price from a plurality of users 110 for an exemplary respective transportation capacity virtual hub combination 311;

Exemplary offer/sell quantity 325 for the best offer quantity from a plurality of users 110 for an exemplary respective transportation capacity virtual hub combination 311;

Exemplary offer/sell quantity 324 for the second-best offer quantity from a plurality of users 110 for an exemplary respective transportation capacity virtual hub combination 311;

Exemplary safety dispatch "911" button 329 to enact video and audio recording of the user 110 environment and dispatch of that information to authorities.

Exemplary hamburger menu button 270 to move back to menu options and settings away from the participation, transaction, trading GUI 210 embodiment.

In some embodiments, the user 110 may enter a transaction quantity and price for transportation capacity units to participate, transact, and/or trade by the GUI 210 detecting user 110 contact with a bid/buy price 318 or offer/sell price 321. The GUI 210 detects user 110 contact with any of the GUI 210 buttons which have been aforementioned. Upon user 110 contact with buttons on the GUI 210, instructions are instantiated which allows the user 110 to change the specifications of the respective virtual hub combination 311. A plurality of prices and markets may be presented based on a plurality of contract specifications. In some embodiments, the best bid/buy price 318 may be moving up in price or down in price depending on the market conditions at any given time. In some embodiments, the last trade or last transacted price for a given specification is listed to help the user 110 understand how the market is moving so that the user 110 may submit a competitive offer/selling price 321 or bid/buying price 314. In some embodiments, users 110 may adjust settings of the GUI 210 to show more bid/buying prices 317 or more offer/selling prices 320. In some embodiments, the matrix of market quantities and prices 313, 314, 315, 316, 317, 318, 319, 320, 321, 324, 325, 326 may be referred to as market depth in the GUI 210 embodiment. In some embodiments, the number of users 110 may be displayed as user icons 312 or 323 for the amount of people logged who desire to transact, trade, or participate in a given virtual hub 310 to virtual hub 322 combination. In some embodiments, users 110 may select the transportation mode 330, such that the user allows a market for only one form of transportation capacity as a commodity, or the user 110 may allow the system to show multiple forms of transportation capacity between two virtual transportation capacity hubs 310, 311, 322. In some embodiments, the GUI 210 may detect a user 110 selecting the 911 button 329, which may activate voice and video recording functions on the mobile or stationary device 111 and transmit the data with a confirmation from the user 110 to the authorities to provide enhanced security while participating, transacting, or trading forward transportation as a commodity. In some embodiments, the user may toggle between the GUI 210 market view screen in FIG. 3 and other menu 270 options and settings by the user 110 selecting the hamburger button 270 and the GUI 210 detecting the user 110 input or contact. In some embodiments, the GUI 210 may instantiate instructions in the memory of the mobile computing device 111, which then transmits transportation capacity data through the network 140 or wireless GPS network 150 to call upon instruction routines and instruction sub-routines on the transportation exchange database server 130, virtual hub database server 120, network member database server 160, no arbitrage condition database server 180, and/or instructions in the memory of the cloud and local CPUs 190, which all interface together to make one system that may deliver transportation capacity units to users 110 from and to a plurality of virtual hubs 310, 322 with a plurality of specifications at specific market prices.

Figure 4:
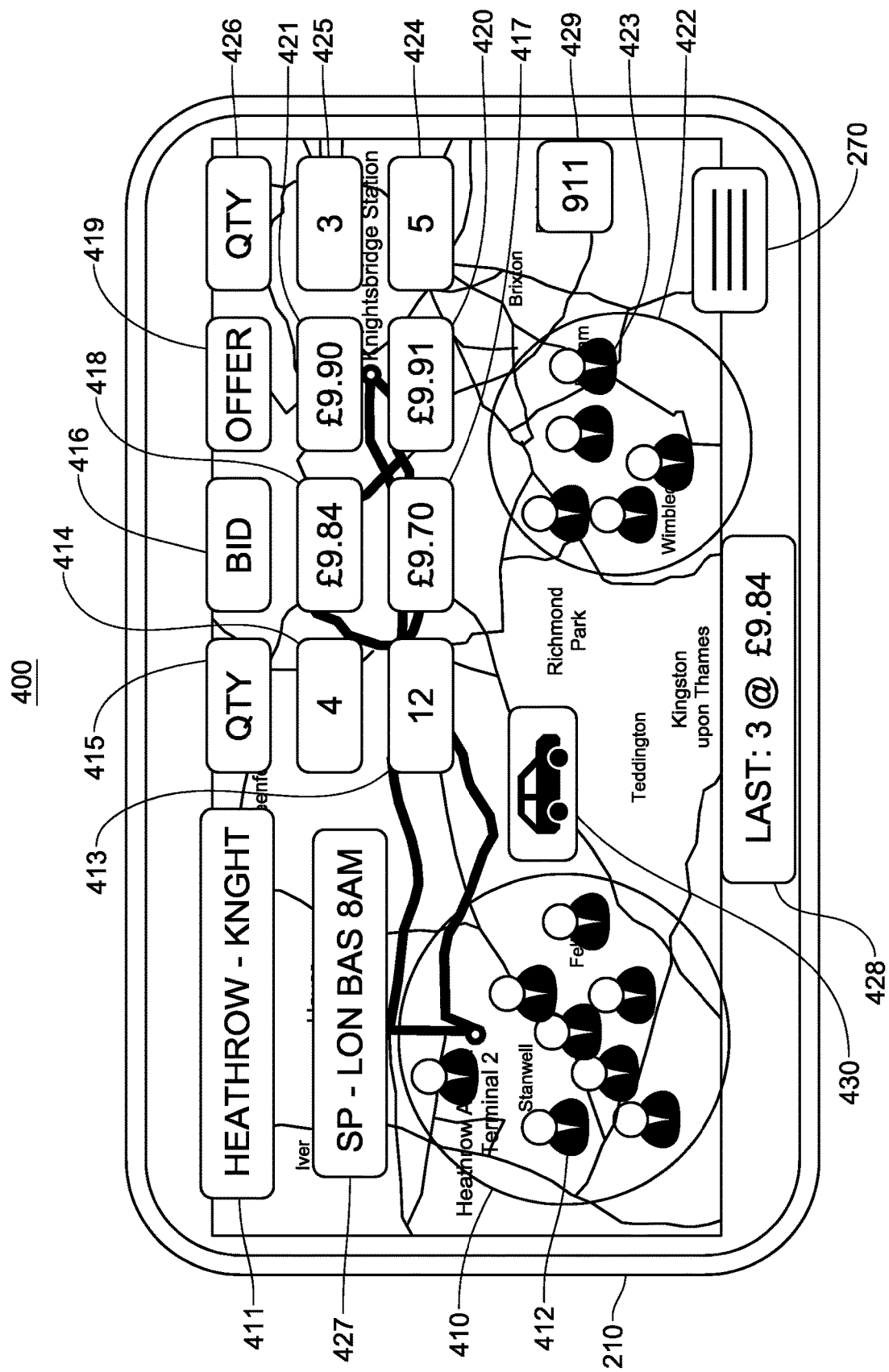
FIG. 4 illustrates exemplary user interfaces with various international configurations in accordance with some embodiments.

FIG. 4 illustrates exemplary user interfaces 210 of a mobile computing device for participating, transacting, and/or trading transportation as a physical forward commodity between combinations of virtual hubs over various transportation modes. In some embodiments, user interface 210 includes the following elements, or a subset or superset thereof:

Exemplary virtual hub combination 411;

Exemplary virtual hub origin/from location 410 with users 412 within the virtual hub location 410;

Exemplary specification summary of the market, level of service and time of delivery commencement 427, in this particular embodiment the GUI 210 has moved to an international virtual market hub combination market such as London;

Exemplary mode of transportation capacity type 430;

Exemplary transaction summary of the last trades quantity and price 428 in the local currency or another currency set by the user 110;

Exemplary virtual hub destination/to location 422 and user who is being delivered on the transportation capacity unit 423;

Exemplary bid/buy quantity title header 415 for an exemplary virtual transportation hub market;

Exemplary bid/buy price title header 416 for an exemplary virtual transportation hub market;

Exemplary offer/sell price title header 419 for an exemplary virtual transportation hub market;

Exemplary offer/sell quantity title header 426 for an exemplary virtual transportation hub market;

Exemplary bid/buy quantity 414 for the best bid quantity from a plurality of users 110 for an exemplary respective transportation capacity virtual hub combination 411;

Exemplary bid/buy quantity 413 for the second-best bid quantity from a plurality of users 110 for an exemplary respective transportation capacity virtual hub combination 411;

Exemplary bid/buy price 418 for the best bid price from a plurality of users 110 for an exemplary respective transportation capacity virtual hub combination 411;

Exemplary bid/buy price 417 for the second-best bid price from a plurality of users 110 for an exemplary respective transportation capacity virtual hub combination 411;

Exemplary offer/sell price 421 for the best offer price from a plurality of users 110 for an exemplary respective transportation capacity virtual hub combination 411;

Exemplary offer/sell price 420 for the second-best offer price from a plurality of users 110 for an exemplary respective transportation capacity virtual hub combination 411;

Exemplary offer/sell quantity 425 for the best offer quantity from a plurality of users 110 for an exemplary respective transportation capacity virtual hub combination 411;

Exemplary offer/sell quantity 424 for the second-best offer quantity from a plurality of users 110 for an exemplary respective transportation capacity virtual hub combination 411;

Exemplary safety dispatch "911" button 429 to enact video and audio recording of the user 110 environment and dispatch of that information to authorities.

Exemplary hamburger menu button 270 to move back to menu options and settings away from the participation, transaction, trading GUI 210 embodiment.

In some embodiments, the user 110 may enter a transaction quantity and price for transportation capacity units to participate, transact, and/or trade by the GUI 210 detecting user 110 contact with a bid/buy price 418 or offer/sell price 421. The GUI 210 detects user 110 contact with any of the GUI 210 buttons which have been aforementioned. Upon user 110 contact with buttons on the GUI 210, instructions are instantiated which allows the user 110 to change the specifications of the respective virtual hub combination 411. A plurality of prices and markets may be presented based on a plurality of contract specifications. In some embodiments, the best bid/buy price 418 may be moving up in price or down in price depending on the market conditions at any given time. In some embodiments, the last trade or last transacted price for a given specification is listed to help the user 110 understand how the market is moving so that the user 110 may submit a competitive offer/selling price 421 or bid/buying price 414. In some embodiments, users 110 may adjust settings of the GUI 210 to show more bid/buying prices 417 or more offer/selling prices 420. In some embodiments, the matrix of market quantities and prices 413, 414, 415, 416, 417, 418, 419, 420, 421, 424, 425, 426 may be referred to as market depth in the GUI 210 embodiment. In some embodiments, the number of users 110 may be displayed as user icons 412 or 423 for the amount of people logged who desire to transact, trade, or participate in a given virtual hub 410 to virtual hub 422 combination. In some embodiments, users 110 may select the transportation mode 430, such that the user allows a market for only one form of transportation capacity as a commodity, or the user 110 may allow the system to show multiple forms of transportation capacity between two virtual transportation capacity hubs 410, 411, 422. In some embodiments, the GUI 210 may detect a user 110 selecting the 911 button 429, which may activate voice and video recording functions on the mobile or stationary device 111 and transmit the data with a confirmation from the user 110 to the authorities to provide enhanced security while participating, transacting, or trading forward transportation as a commodity. In some embodiments, the user may toggle between the GUI 210 market view screen in FIG. 4 and other menu 270 options and settings by the user 110 selecting the hamburger button 270 and the GUI 210 detecting the user 110 input or contact. In some embodiments, the GUI 210 may instantiate instructions in the memory of the mobile computing device 111, which then transmits transportation capacity data through the network 140 or wireless GPS network 150 to call upon instruction routines and instruction sub-routines on the transportation exchange database server 130, virtual hub database server 120, network member database server 160, no arbitrage condition database server 180, and/or instructions in the memory of the cloud and local CPUs 190, which all interface together to make one system that may deliver transportation capacity units to users 110 from and to a plurality of virtual hubs 410, 422 with a plurality of specifications at specific market prices.

Figure 5:
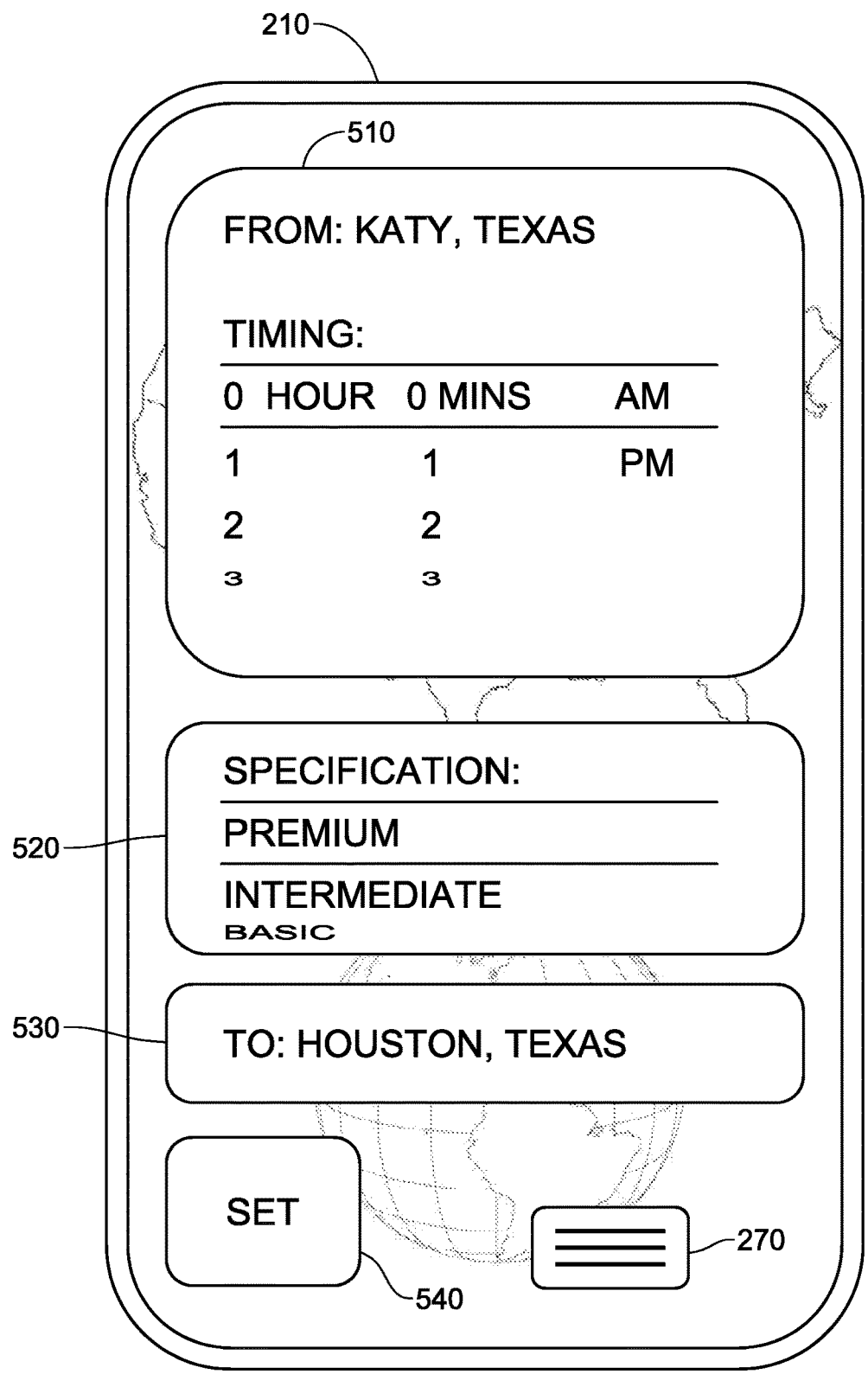
FIG. 5 illustrates exemplary user interfaces to select a specification grade of transportation capacity with various timing specifications in accordance with some embodiments.

FIG. 5 illustrates an exemplary user interface 210 for listing timing specifications 510 on a portable multifunction device (e.g., a mobile computing device) in accordance with some embodiments. In some embodiments, user interface 210 includes the following elements, or a subset or superset thereof:

Origin/From virtual hub timing 510;
Specification of quality of transportation capacity 520;
Destination/To virtual hub 530;
Setting button 540 to transmit the timings 510 and quality specification grade 520;
Hamburger button 270 to instruct the GUI 210 to take the user 110 to the menu screen.

In some embodiments, the user 110 may select a plurality of timing options in the timing selection specification 510. The timing specification constraint may be the time at which the transportation capacity unit departs from the origin/from virtual hub 410. As in any commodity market, if a user 110 is late and they have purchased the transportation capacity unit, the user must still pay for the transportation capacity unit regardless if the user 110 is present at the time of departure or not. The user has the option if they know they will be late to sell back the transportation capacity unit to the market at the then current price. Accordingly, for the purpose of example, but not limiting by example, if a user 110 bought a transportation capacity unit for £9.90 421 and the user 110 realized they would be late for the 8 am departure specification 427, then the user 110 may either pay for the transportation unit even though the user 110 was present and did not take delivery of the transportation unit, or the user 110 may preemptively sell back the transportation capacity unit to the market at the then current bid price 418. The user 110 would then have offset their obligation in a timely manner and another user 110 on the network 140, 160 may then purchase the available transportation capacity unit. In some embodiments, virtual transportation hub combination units may or may not have the available liquidity if the user 110 were to wait too long before delivery of the transportation capacity unit to make an adjustment and therefore may need to take delivery even if they are not present. In some embodiments, the user 110 may select a grade specification 520. For the purpose of example, but not limiting by example, a plurality of specification grades may exist, such as "premium", which may be defined by certain classes of transportation capacity units and/or certain quality levels. Similarly, for the purpose of example, but not limiting by example, a plurality of specification grades may exist such as "intermediate" or "basic" which may be defined by certain classes of transportation capacity units and/or certain quality levels. In some embodiments, the user 110 may select the destination/to virtual hub 530 to change the virtual hub combination. In some embodiments, the user 110 may contact the "set" button 540 to transmit the transportation capacity unit specification data by using the GUI 210 which may instantiate instructions in the memory of the mobile computing device 111 which then transmits transportation capacity data through the network 140 or wireless GPS network 150 to call upon instruction routines and instruction sub-routines on the transportation exchange database server 130, virtual hub database server 120, network member database server 160, no arbitrage condition database server 180, and/or instructions in the memory of the cloud and local CPUs 190, which all interface together to make one system that may deliver transportation capacity units to users 110 from and to a plurality of virtual hubs 410, 422 with a plurality of specifications at specific market prices.

Figure 6:
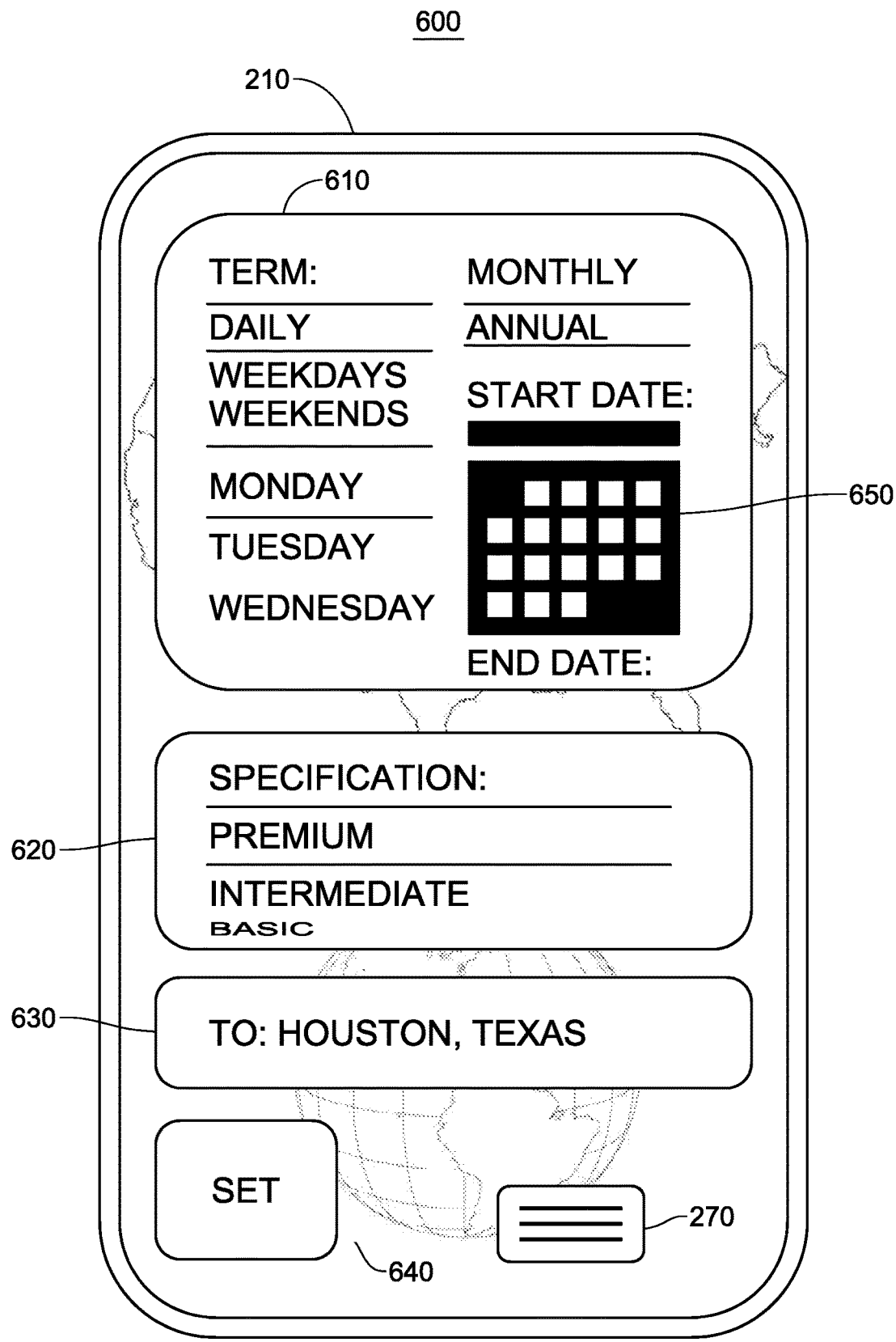
FIG. 6 illustrates exemplary user interfaces with various term specifications for transportation capacity in accordance with some embodiments.

FIG. 6 illustrates an exemplary user interface 210 for selecting the term specification 610 on a portable multifunction device (e.g., a mobile computing device) in accordance with some embodiments. In some embodiments, user interface 210 includes the following elements, or a subset or superset thereof:

Term specification options 610;
Specification of quality of transportation capacity 620;
Destination/To virtual hub 630;
Setting button 640 to transmit the term 610 and quality specification grade 620;
Calendar button 650 to select specification start dates and end dates for a plurality of virtual transportation hub combinations;
Hamburger button 270 to instruct the GUI 210 to take the user 110 to the menu screen.

In some embodiments, the term specification 610 may be used to participate, transact, and/or trade in a specific virtual hub combination for a specific time period specification. Users 110 may set the term to daily, weekly, monthly, annual, weekdays, weekends, specific days, such as Monday, Tuesday, Wednesday, Thursday, Friday, Saturday, Sunday, or any combination of term selections the user 110 sets as relevant for participating, transacting, or trading in the transportation capacity unit market. Not limiting by example, but for use of illustrating a possible subset of term selections, the user 110 may select "weekdays" 610 during a specific calendar time period 650 of a given year. In some embodiments, specific time start dates and end dates may be set by the user with the calendar button 650. In some embodiments a user 110 may select "Mondays" 610 within a specification date window 650. In some embodiments, the user 110 may select "weekends" 610 during a specification calendar window of dates 650. In some embodiments, the user 110 may contact the "set" button 640 to transmit the transportation capacity unit specification data by using the GUI 210 which may instantiate instructions in the memory of the mobile computing device 111 which then transmits transportation capacity data through the network 140 or wireless GPS network 150 to call upon instruction routines and instruction sub-routines on the transportation exchange database server 130, virtual hub database server 120, network member database server 160, no arbitrage condition database server 180, and/or instructions in the memory of the cloud and local CPUs 190, which all interface together to make one system that may deliver transportation capacity units to users 110 from and to a plurality of virtual hubs 410, 422 with a plurality of specifications at specific market prices.

Figure 7:
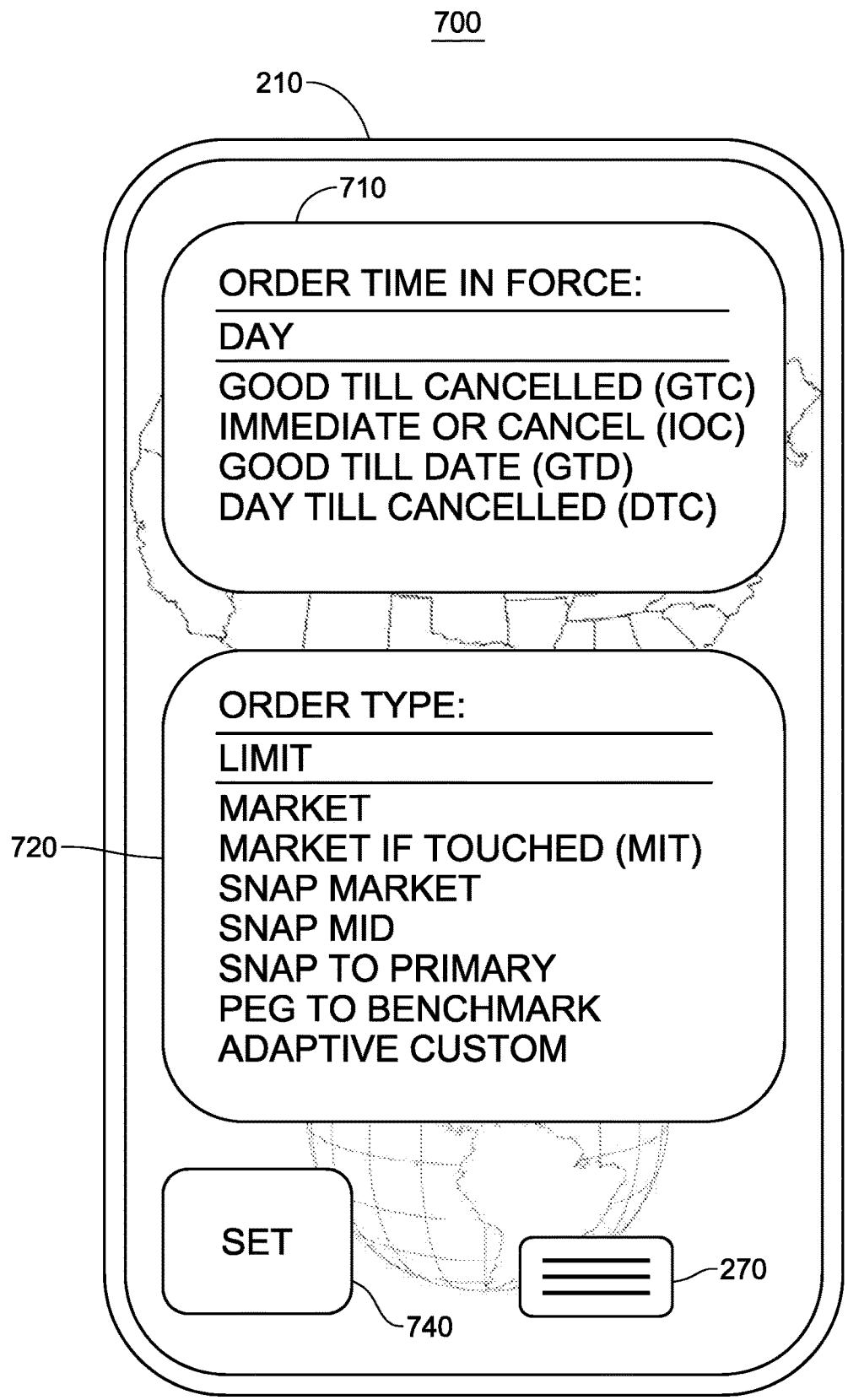
FIG. 7 illustrates exemplary user interfaces with various order types and order time in force designations for transportation capacity in accordance with some embodiments.

FIG. 7 illustrates an exemplary user interface 210 for selecting order time in force order types 710 as well as order types 720 on a portable multifunction device (e.g., a mobile computing device) in accordance with some embodiments. In some embodiments, user interface 210 includes the following elements, or a subset or superset thereof:

Order time in force specification options 710;
Order type specification options 720;
Setting button 740 to transmit the order time in force specification 710 and Order type specification option 720;
Hamburger button 270 to instruct the GUI 210 to take the user 110 to the menu screen.

In some embodiments, user interface 210 may be used by the user 110 to select a plurality of order time in force specifications 710. In some embodiments, order time in force selections 710 may include a subset or superset thereof: day (DAY) order; good till cancelled order (GTC); immediate or cancel order (100), good till date order (GTD); and day till cancelled order (DTC). Order time in force specifications 710 may be used to designate how long a user 110 order may be valid. In some embodiments, the GUI 210 may display the definitions of a plurality of order time in force specification 710 characteristics, so that the user 110 may select the appropriate order time in force specification 710 for the transportation capacity unit that the user 110 may participate, transact, and/or trade. In some embodiments, the user interface 210 may be used to select the order type specifications 720. In some embodiments, order type selections 720 may include a subset or superset thereof: Limit, Market, Market if Touched (MIT); Snap to Market; Snap to Mid; Snap to primary; Peg to benchmark; and adaptive custom. In some embodiments, the GUI 210 may display the definitions of a plurality of order types specification 720 characteristics, so that the user 110 may select the appropriate order type specification 720 for the transportation capacity unit that the user 110 may participate, transact, and/or trade. In some embodiments, the user 110 may contact the "set" button 740 to transmit the transportation capacity unit specification data by using the GUI 210, which may instantiate instructions in the memory of the mobile computing device 111, which then transmits transportation capacity data through the network 140 or wireless GPS network 150 to call upon instruction routines and instruction sub-routines on the transportation exchange database server 130, virtual hub database server 120, network member database server 160, no arbitrage condition database server 180 and/or instructions in the memory of the cloud and local CPUs 190, which all interface together to make one system that may deliver transportation capacity units to users 110 from and to a plurality of virtual hubs 410, 422 with a plurality of specifications at specific market prices.

Figure 8:
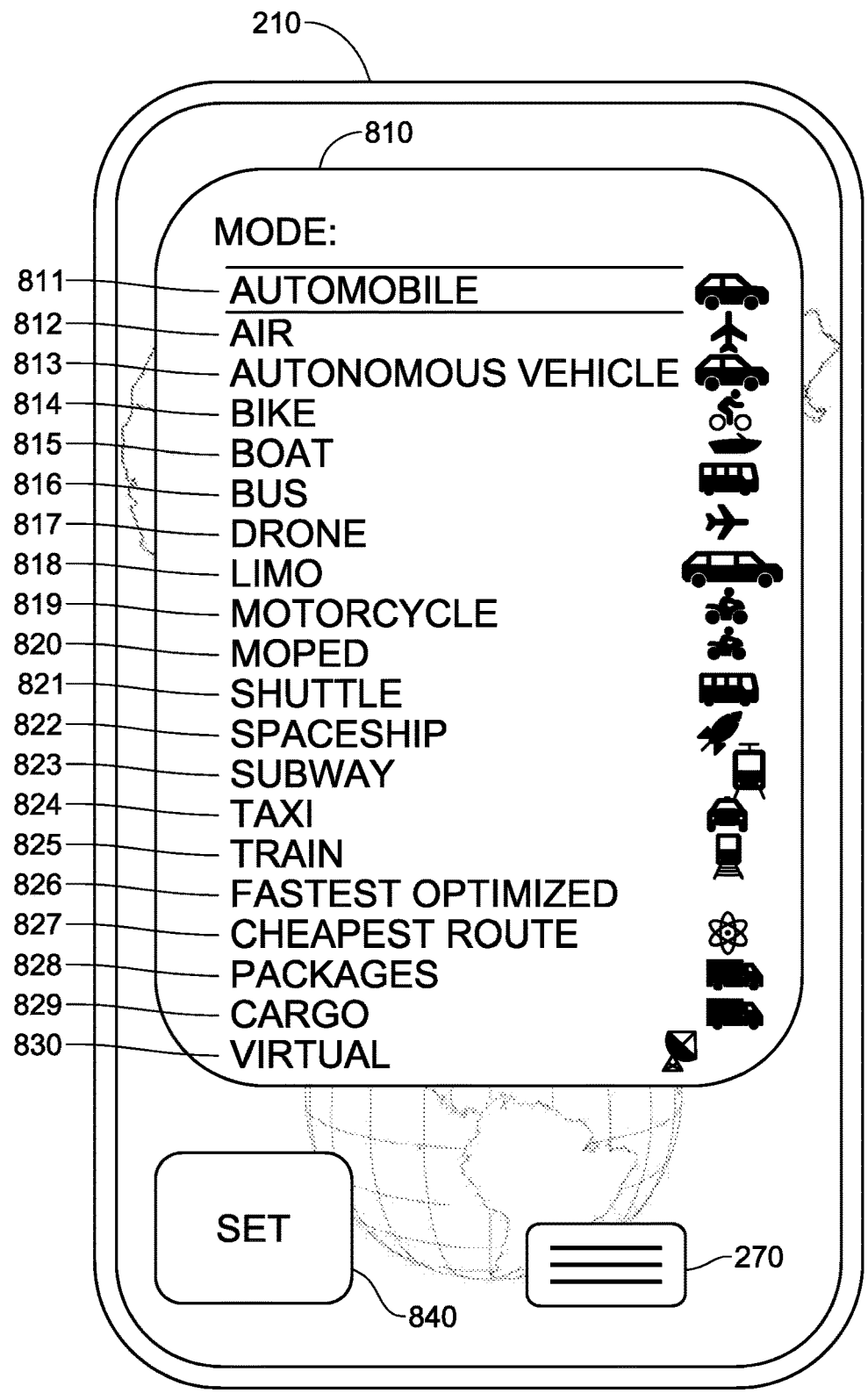
FIG. 8 illustrates exemplary user interfaces with various modes of transportation capacity in accordance with some embodiments.

FIG. 8 illustrates an exemplary user interface 210 for selecting virtual hub transportation capacity unit modes 810 on a portable multifunction device (e.g., a mobile computing device) in accordance with some embodiments. In some embodiments, user interface 210 includes the following elements, or a subset or superset thereof:

Virtual hub transportation capacity unit modes 810;
Setting button 840 to transmit the virtual hub transportation capacity unit modes 810;
Hamburger button 270 to instruct the GUI 210 to take the user 110 to the menu screen.

In some embodiments, user interface 210 may be used by the user 110 to select a plurality of virtual hub transportation capacity unit modes 810 specifications. In some embodiments, virtual hub transportation capacity unit mode selections 810 may include a subset or superset thereof: automobile 811; air 812; autonomous vehicle 813; bike 814; boat 815; bus 816; drone 817; limo 818; motorcycle 819; moped 820; shuttle 821; space 822; subway 823; taxi 824; train 825; fastest optimized 826; cheapest route 827; packages 828; cargo 829; and virtual 830. In some embodiments, virtual hub transportation capacity unit modes are simply that a user 110 would have a virtual transportation capacity unit seat in an automobile or an airplane as examples, but not limiting by example. In some embodiments, the user 110 may bid on cargo 829 or package capacity 828 in any mode of transportation capacity between a combination of virtual transportation hub locations. In some embodiments, the user 110 may use one or multiple modes of transportation between a combination of virtual transportation hub capacity points. In some embodiments, the user 110 may contact the "set"

button 840 to transmit the transportation capacity unit specification mode data by using the GUI 210, which may instantiate instructions in the memory of the mobile computing device 111, which then transmits transportation capacity data through the network 140 or wireless GPS network 150 to call upon instruction routines and instruction sub-routines on the transportation exchange database server 130, virtual hub database server 120, network member database server 160, no arbitrage condition database server 180, and/or instructions in the memory of the cloud and local CPUs 190, which all interface together to make one system that may deliver transportation capacity units to users 110 from and to a plurality of virtual hubs 410, 422 with a plurality of specifications at specific market prices.

Figure 9:
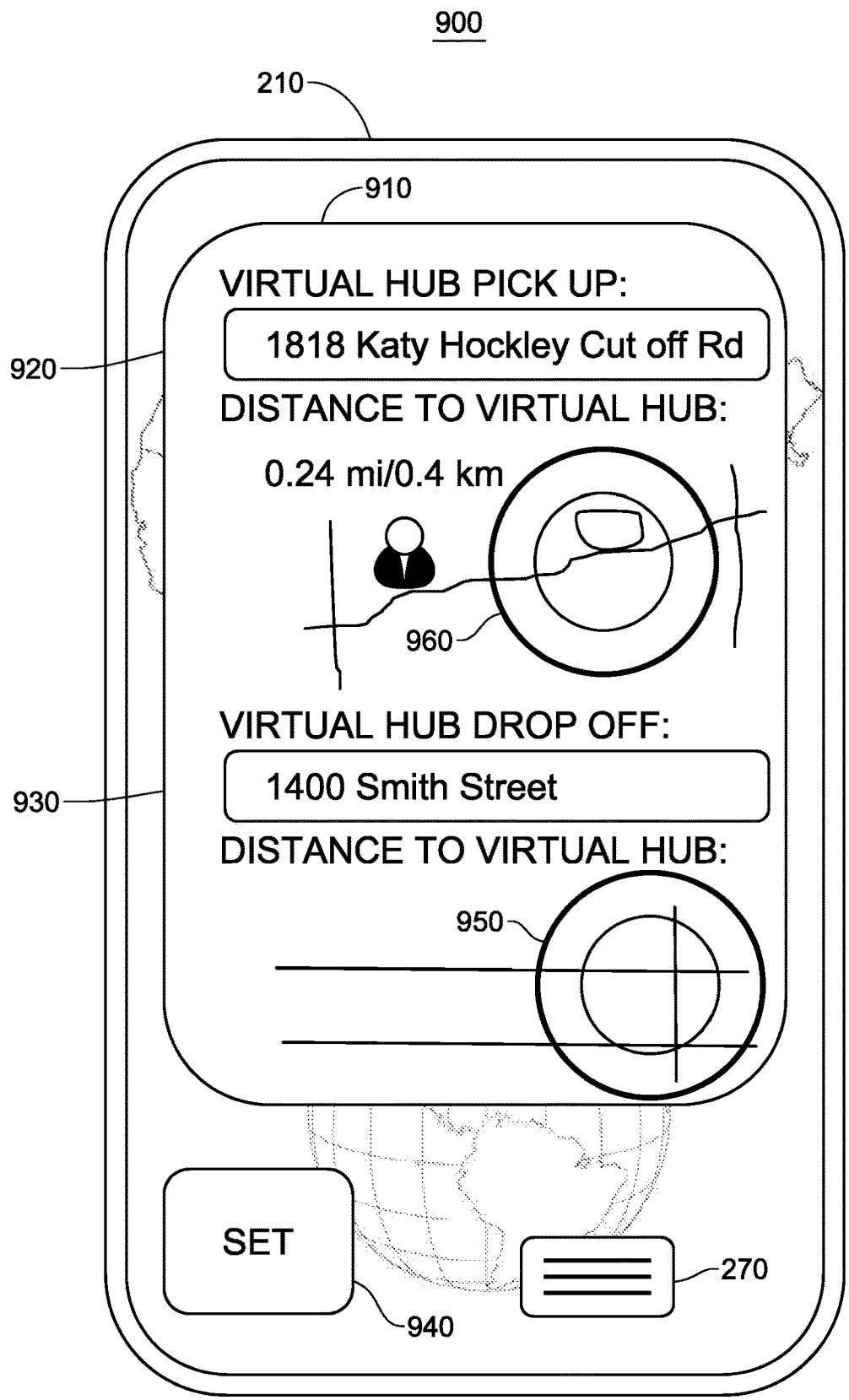
FIG. 9 illustrates exemplary user interfaces with the distance between the user and a virtual hub pick up point for transportation capacity as well as the distance between a user and a virtual drop off point for transportation in accordance with some embodiments.

FIG. 9 illustrates an exemplary user interface 210 for identifying the distance the user 110 is from the virtual hub from a map and distance perspective on a portable multifunction device (e.g., a mobile computing device) in accordance with some embodiments. In some embodiments, user interface 210 includes the following elements, or a subset or superset thereof:

Virtual hub transportation capacity unit pick up display 910;
Virtual hub transportation capacity unit pick up address 920;
Virtual hub transportation capacity unit drop off address 930;
Virtual hub transportation capacity pick-up target zone 960;
Virtual hub transportation capacity drop-off target zone 950;
Setting button 940 to transmit the virtual hub transportation capacity unit addresses 920, 930;
Hamburger button 270 to instruct the GUI 210 to take the user 110 to the menu screen.

In some embodiments, user interface 210 may be used by the user 110 to select a plurality of virtual hub transportation capacity unit address 910 specifications. In some embodiments, virtual hub transportation capacity unit address selections 910 may include a subset or superset thereof: virtual hub pick up address 920; virtual hub drop off address 930. In some embodiments, virtual hub transportation capacity unit addresses 920 and 930 may be changed before delivery of a virtual transportation capacity unit. The user interface map and address tool 910 displays the users 110 distance from the address of the virtual transportation hub as well as a map to assist the user 110 in finding the location of the virtual transportation hub. In some embodiments, user interface 210 displays the virtual hub pick up zone 960 on a map in context to the user's 110 location. In some embodiments, user interface 210 displays the virtual hub drop off zone 950 on a map in context to the user's 110 location. In some embodiments, the user 110 may contact the "set" button 940 to transmit the transportation capacity unit specification address data by using the GUI 210, which may instantiate instructions in the memory of the mobile computing device 111, which then transmits transportation capacity data through the network 140 or wireless GPS network 150 to call upon instruction routines and instruction sub-routines on the transportation exchange database server 130, virtual hub database server 120, network member database server 160, no arbitrage condition database server 180, and/or instructions in the memory of the cloud and local CPUs 190, which all interface together to make one system that may deliver transportation capacity units to users 110 from and to a plurality of virtual hubs 410, 422 with a plurality of specifications at specific market prices.

Figure 10:
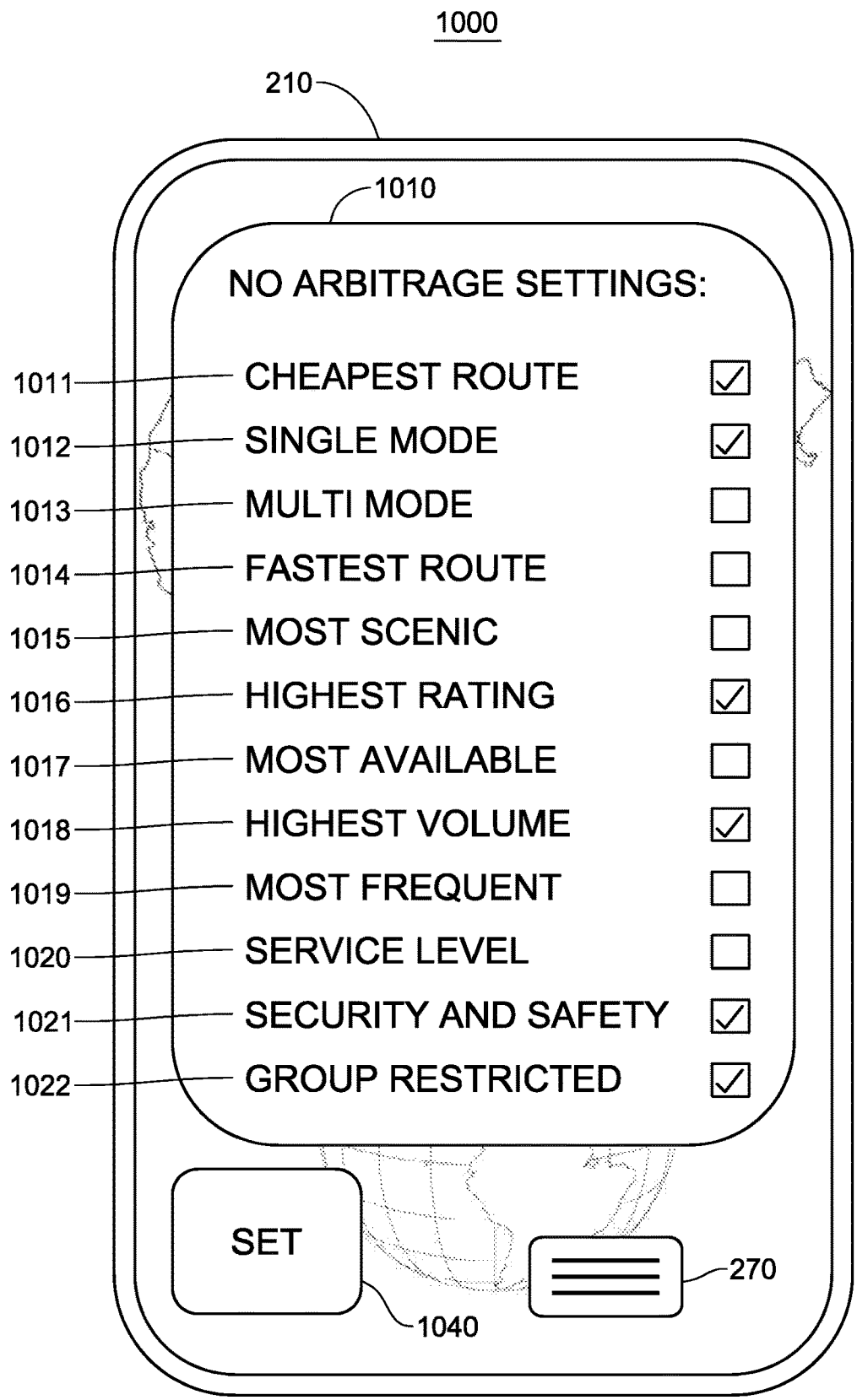
FIG. 10 illustrates exemplary user interfaces for settings and constraints of the transportation capacity trading method and system in accordance with some embodiments.

FIG. 10 illustrates an exemplary user interface 210 for identifying the constraints and no arbitrage settings 1010 the user 110 selects on a portable multifunction device (e.g., a mobile computing device) in accordance with some embodiments. In some embodiments, user interface 210 includes the following elements, or a subset or superset thereof:

Constraint and no arbitrage settings 1010;
Setting button 1040 to transmit the virtual hub transportation capacity constraints and no arbitrage settings;
Hamburger button 270 to instruct the GUI 210 to take the user 110 to the menu screen.

In some embodiments, user interface 210 may be used by the user 110 to select a plurality of virtual hub transportation capacity constraint and no arbitrage settings 1010. In some embodiments, virtual hub transportation capacity unit constraint and no arbitrage selections 1010 may include a subset or superset thereof: cheapest route 1011; single mode 1012; multi-mode 1013; fastest route 1014; most scenic 1015; highest rating 1016; most available 1017; highest volume 1018; most frequent 1019; service level 1020; and security and safety 1021. In some embodiments, the "cheapest route setting" 1011 instantiates instructions in the memory of the CPU 190 to complete a standard cost minimization linear program to assist the user 110 to complete the transportation capacity unit between two virtual hubs with the lowest cost. In some embodiments, the "single mode" 1012 instantiates instructions in the memory of the CPU 190 to set a constraint for the user 110 to complete the transportation capacity unit between two virtual hubs with the only one mode of transportation. In some embodiments, the "multi mode" 1013 instantiates instructions in the memory of the CPU 190 to set a constraint for the user 110 to complete the transportation capacity unit between two virtual hubs with more than one mode of transportation. In some embodiments, the "fastest route" 1014 instantiates instructions in the memory of the CPU 190 to complete standard linear programming equation to minimize travel time for the user 110 to complete the transportation capacity unit between two virtual hubs with the shortest time. In some embodiments, the "most scenic" 1015 instantiates instructions in the memory of the CPU 190 to complete an algorithm with the highest ratings for scenery to assist the user 110 to complete the transportation capacity unit between two virtual hubs with highest scenery rating. In some embodiments, the "highest rating" 1016 instantiates instructions in the memory of the CPU 190 to complete a rating algorithm to assist the user 110 to complete the transportation capacity unit between two virtual hubs with the highest rating. In some embodiments, the "most available" 1017 instantiates instructions in the memory of the CPU 190 to complete an algorithm to search for the route with the most open transportation capacity units to assist the user 110 to complete the transportation capacity unit between two virtual hubs with the most available open seats or open transportation capacity units. In some embodiments, the "highest volume" 1018 instantiates instructions in the memory of the CPU 190 to complete an algorithm to select the route with the highest volume of participants to assist the user 110 to complete the transportation capacity unit between two virtual hubs with the largest number of users 110. In some embodiments, the "most frequent" 1019 instantiates instructions in the memory of the CPU 190 to complete most frequent route analysis from a timing constraint perspective to assist the user 110 to complete the transportation capacity unit between two virtual hubs with the most frequent departures. In some embodiments, the "service level" 1020 instantiates instructions in the memory of the CPU 190 to align the constraint to select the service level to assist the user 110 to complete the transportation capacity unit between two virtual hubs with the correct level of service. In some embodiments, the "security and safety" 1021 instantiates instructions in the memory of the CPU 190 to run safety and security algorithms on the user's 110 based on block chain performance of drivers and riders to assist the user 110 to complete the transportation capacity unit between two virtual hubs with the highest level of safety and security. In some embodiments, the user 110 may contact the "set" button 1040 to transmit the transportation capacity unit specification constraint and arbitrage data by using the GUI 210, which may instantiate instructions in the memory of the mobile computing device 111, which then transmits transportation capacity security and safety data through the network 140 or wireless GPS network 150 to call upon instruction routines and instruction sub-routines on the transportation exchange database server 130, virtual hub database server 120, network member database server 160, no arbitrage condition database server 180, and/or instructions in the memory of the cloud and local CPUs 190, which all interface together to make one system that may deliver transportation capacity units to users 110 from and to a plurality of virtual hubs 410, 422 with a plurality of specifications at specific market prices.

Figure 11:
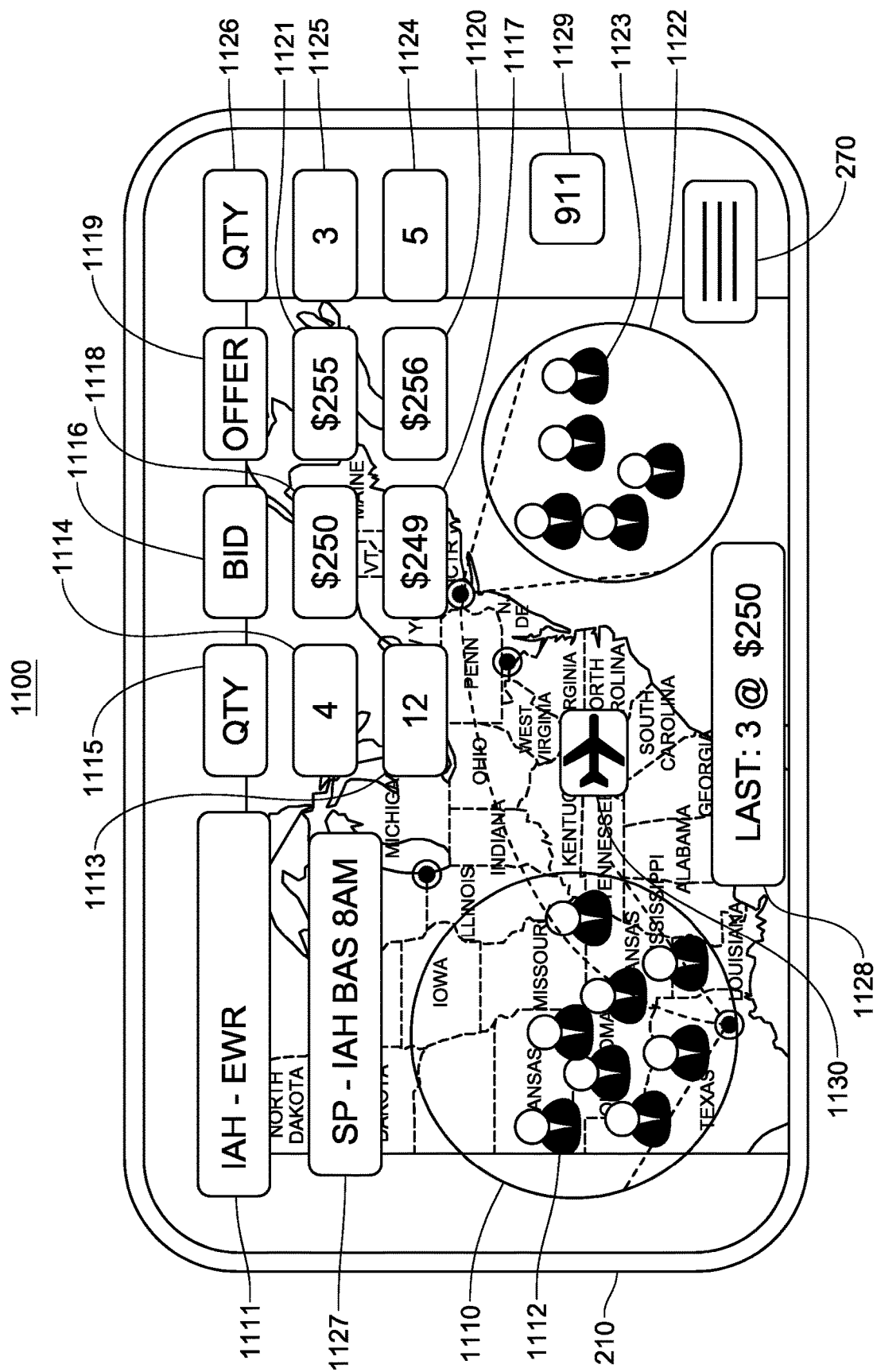
FIG. 11 illustrates exemplary user interfaces for transacting and trading domestic air travel transportation capacity in accordance with some embodiments.

FIG. 11 illustrates exemplary user interfaces 210 for participating, transacting, and/or trading transportation as a physical forward commodity between combinations of virtual hubs over various transportation modes. In some embodiments, user interface 210 includes the following elements, or a subset or superset thereof:

Exemplary virtual hub combination 1111;
Exemplary virtual hub origin/from location 1110 with users 1112 within the virtual hub location 1110;
Exemplary specification summary of the market, level of service and time of delivery commencement 1127;
Exemplary mode of transportation capacity type 1130;
Exemplary transaction summary of the last trades quantity and price 1128;
Exemplary virtual hub destination/to location 1122 and user who is being delivered on the transportation capacity unit 1123;
Exemplary bid/buy quantity title header 1115 for an exemplary virtual transportation hub market;
Exemplary bid/buy price title header 1116 for an exemplary virtual transportation hub market;
Exemplary offer/sell price title header 1119 for an exemplary virtual transportation hub market;
Exemplary offer/sell quantity title header 1126 for an exemplary virtual transportation hub market;
Exemplary bid/buy quantity 1114 for the best bid quantity from a plurality of users 110 for an exemplary respective transportation capacity virtual hub combination 1111;
Exemplary bid/buy quantity 1113 for the second-best bid quantity from a plurality of users 110 for an exemplary respective transportation capacity virtual hub combination 1111;
Exemplary bid/buy price 1118 for the best bid price from a plurality of users 110 for an exemplary respective transportation capacity virtual hub combination 1111;
Exemplary bid/buy price 1117 for the second-best bid price from a plurality of users 110 for an exemplary respective transportation capacity virtual hub combination 1111;
Exemplary offer/sell price 1121 for the best offer price from a plurality of users 110 for an exemplary respective transportation capacity virtual hub combination 1111;
Exemplary offer/sell price 1120 for the second-best offer price from a plurality of users 110 for an exemplary respective transportation capacity virtual hub combination 1111;
Exemplary offer/sell quantity 1125 for the best offer quantity from a plurality of users 110 for an exemplary respective transportation capacity virtual hub combination 1111;
Exemplary offer/sell quantity 1124 for the second-best offer quantity from a plurality of users 110 for an exemplary respective transportation capacity virtual hub combination 1111;
Exemplary safety dispatch "911" button 1129 to enact video and audio recording of the user 110 environment and dispatch of that information to authorities.
Exemplary hamburger menu button 270 to move back to menu options and settings away from the participation, transaction, trading GUI 210 embodiment.

In some embodiments, the user 110 may enter a transaction quantity and price for transportation capacity units to participate, transact, and/or trade by the GUI 210 detecting user 110 contact with a bid/buy price 1118 or offer/sell price 1121. The GUI 210 detects user 110 contact with any of the GUI 210 buttons which have been aforementioned. Upon user 110 contact with buttons on the GUI 210, instructions are instantiated which allows the user 110 to change the specifications of the respective virtual hub combination 1111. A plurality of prices and markets may be presented based on a plurality of contract specifications. In some embodiments, the best bid/buy price 1118 may be moving up in price or down in price depending on the market conditions at any given time. In some embodiments, the last trade or last transacted price for a given the user 110 may submit a competitive offer/selling price 1121 or bid/buying price 1114. In some embodiments, users 110 may adjust settings of the GUI 210 to show more bid/buying prices 1117 or more offer/selling prices 1120. In some embodiments, the matrix of market quantities and prices 1113, 1114, 1115, 1116, 1117, 1118, 1119, 1120, 1121, 1124, 1125, 1126 may be referred to as market depth in the GUI 210 embodiment. In some embodiments, the number of users 110 may be displayed as user icons 1112 or 1123 for the amount of people logged who desire to transact, trade, or participate in a given virtual hub 1110 to virtual hub 1122 combination. In some embodiments, users 110 may select the transportation mode 1130, such that the user allows a market for only one form of transportation capacity as a commodity, or the user 110 may allow the system to show multiple forms of transportation capacity between two virtual transportation capacity hubs 1110, 1111, 1122. In some embodiments, the GUI 210 may detect a user 110 selecting the 911 button 1129, which may activate voice and video recording functions on the mobile or stationary device 111 and transmit the data with a confirmation from the user 110 to the authorities to provide enhanced security while participating, transacting, or trading forward transportation as a commodity. In some embodiments, the user may toggle between the GUI 210 market view screen in FIG. 11 and other menu 270 options and settings by the user 110 selecting the hamburger button 270 and the GUI 210 detecting the user 110 input or contact. In some embodiments, the GUI 210 may instantiate instructions in the memory of the mobile computing device 111, which then transmits transportation capacity data through the network 140 or wireless GPS network 150 to call upon instruction routines and instruction sub-routines on the transportation exchange database server 130, virtual hub database server 120, network member database server 160, no arbitrage condition database server 180, and/or instructions in the memory of the cloud and local CPUs 190, which all interface together to make one system that may deliver transportation capacity units to users 110 from and to a plurality of virtual hubs 1110, 1122 with a plurality of specifications at specific market prices.

Figure 12:
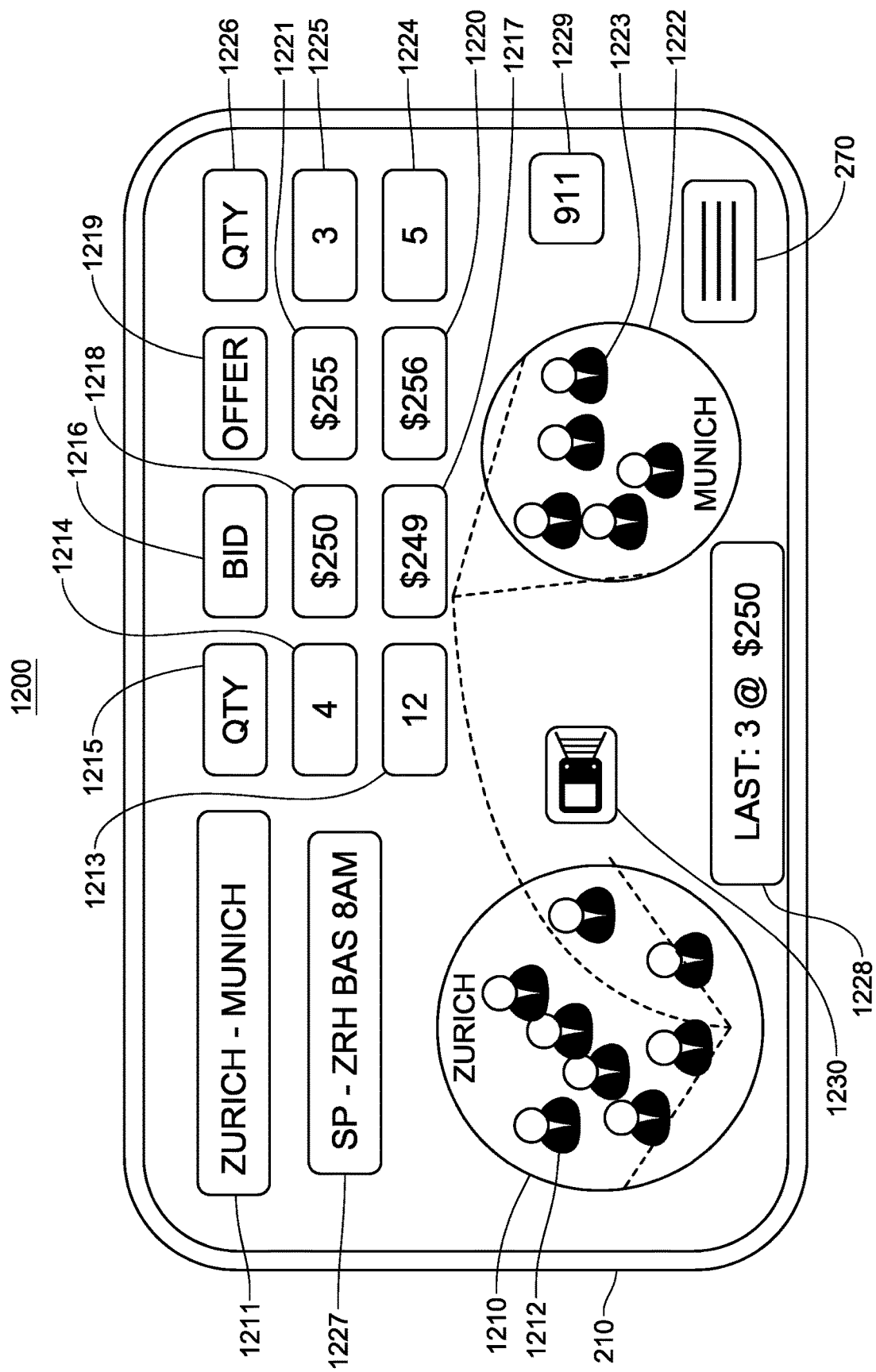
FIG. 12 illustrates exemplary user interfaces for transacting and trading international train transportation capacity in accordance with some embodiments.

FIG. 12 illustrates exemplary user interfaces 210 for participating, transacting, and/or trading transportation as a physical forward commodity between combinations of virtual hubs over various transportation modes. In some embodiments, user interface 210 includes the following elements, or a subset or superset thereof:

Exemplary virtual hub combination 1211;

Exemplary virtual hub origin/from location 1210 with users 1212 within the virtual hub location 1210;

Exemplary specification summary of the market, level of service and time of delivery commencement 1227;

Exemplary mode of transportation capacity type 1230;

Exemplary transaction summary of the last trades quantity and price 1228;

Exemplary virtual hub destination/to location 1222 and user who is being delivered on the transportation capacity unit 1223;

Exemplary bid/buy quantity title header 1215 for an exemplary virtual transportation hub market;

Exemplary bid/buy price title header 1216 for an exemplary virtual transportation hub market;

Exemplary offer/sell price title header 1219 for an exemplary virtual transportation hub market;

Exemplary offer/sell quantity title header 1226 for an exemplary virtual transportation hub market;

Exemplary bid/buy quantity 1214 for the best bid quantity from a plurality of users 110 for an exemplary respective transportation capacity virtual hub combination 1111;

Exemplary bid/buy quantity 1213 for the second-best bid quantity from a plurality of users 110 for an exemplary respective transportation capacity virtual hub combination 1211;

Exemplary bid/buy price 1218 for the best bid price from a plurality of users 110 for an exemplary respective transportation capacity virtual hub combination 1211;

Exemplary bid/buy price 1217 for the second-best bid price from a plurality of users 110 for an exemplary respective transportation capacity virtual hub combination 1211;

Exemplary offer/sell price 1221 for the best offer price from a plurality of users 110 for an exemplary respective transportation capacity virtual hub combination 1211;

Exemplary offer/sell price 1220 for the second-best offer price from a plurality of users 110 for an exemplary respective transportation capacity virtual hub combination 1211;

Exemplary offer/sell quantity 1225 for the best offer quantity from a plurality of users 110 for an exemplary respective transportation capacity virtual hub combination 1211;

Exemplary offer/sell quantity 1224 for the second-best offer quantity from a plurality of users 110 for an exemplary respective transportation capacity virtual hub combination 1211;

Exemplary safety dispatch "911" button 1229 to enact video and audio recording of the user 110 environment and dispatch of that information to authorities.

Exemplary hamburger menu button 270 to move back to menu options and settings away from the participation, transaction, trading GUI 210 embodiment.

In some embodiments, the user 110 may enter a transaction quantity and price for transportation capacity units to participate, transact, and/or trade by the GUI 210 detecting user 110 contact with a bid/buy price 1218 or offer/sell price 1221. The GUI 210 detects user 110 contact with any of the GUI 210 buttons which have been aforementioned. Upon user 110 contact with buttons on the GUI 210, instructions are instantiated which allows the user 110 to change the specifications of the respective virtual hub combination 1211. A plurality of prices and markets may be presented based on a plurality of contract specifications. In some embodiments, the best bid/buy price 1218 may be moving up in price or down in price depending on the market conditions at any given time. In some embodiments, the last trade or last transacted price for a given the user 110 may submit a competitive offer/selling price 1221 or bid/buying price 1214. In some embodiments, users 110 may adjust settings of the GUI 210 to show more bid/buying prices 1217 or more offer/selling prices 1120. In some embodiments, the matrix of market quantities and prices 1213, 1214, 1215, 1216, 1217, 1218, 1219, 1220, 1221, 1224, 1225, 1226 may be referred to as market depth in the GUI 210 embodiment. In some embodiments, the number of users 110 may be displayed as user icons 1212 or 1223 for the amount of people logged who desire to transact, trade, or participate in a given virtual hub 1210 to virtual hub 1222 combination. In some embodiments, users 110 may select the transportation mode 1230, such that the user allows a market for only one form of transportation capacity as a commodity, or the user 110 may allow the system to show multiple forms of transportation capacity between two virtual transportation capacity hubs 1210, 1211, 1222. In some embodiments, the GUI 210 may detect a user 110 selecting the 911 button 1229, which may activate voice and video recording functions on the mobile or stationary device 111 and transmit the data with a confirmation from the user 110 to the authorities to provide enhanced security while participating, transacting, or trading forward transportation as a commodity. In some embodiments, the user may toggle between the GUI 210 market view screen in FIG. 12 and other menu 270 options and settings by the user 110 selecting the hamburger button 270 and the GUI 210 detecting the user 110 input or contact. In some embodiments, the GUI 210 may instantiate instructions in the memory of the mobile computing device 111, which then transmits transportation capacity data through the network 140 or wireless GPS network 150 to call upon instruction routines and instruction sub-routines on the transportation exchange database server 130, virtual hub database server 120, network member database server 160, no arbitrage condition database server 180, and/or instructions in the memory of the cloud and local CPUs 190, which all interface together to make one system that may deliver transportation capacity units to users 110 from and to a plurality of virtual hubs 1210, 1222 with a plurality of specifications at specific market prices.

Figure 13:
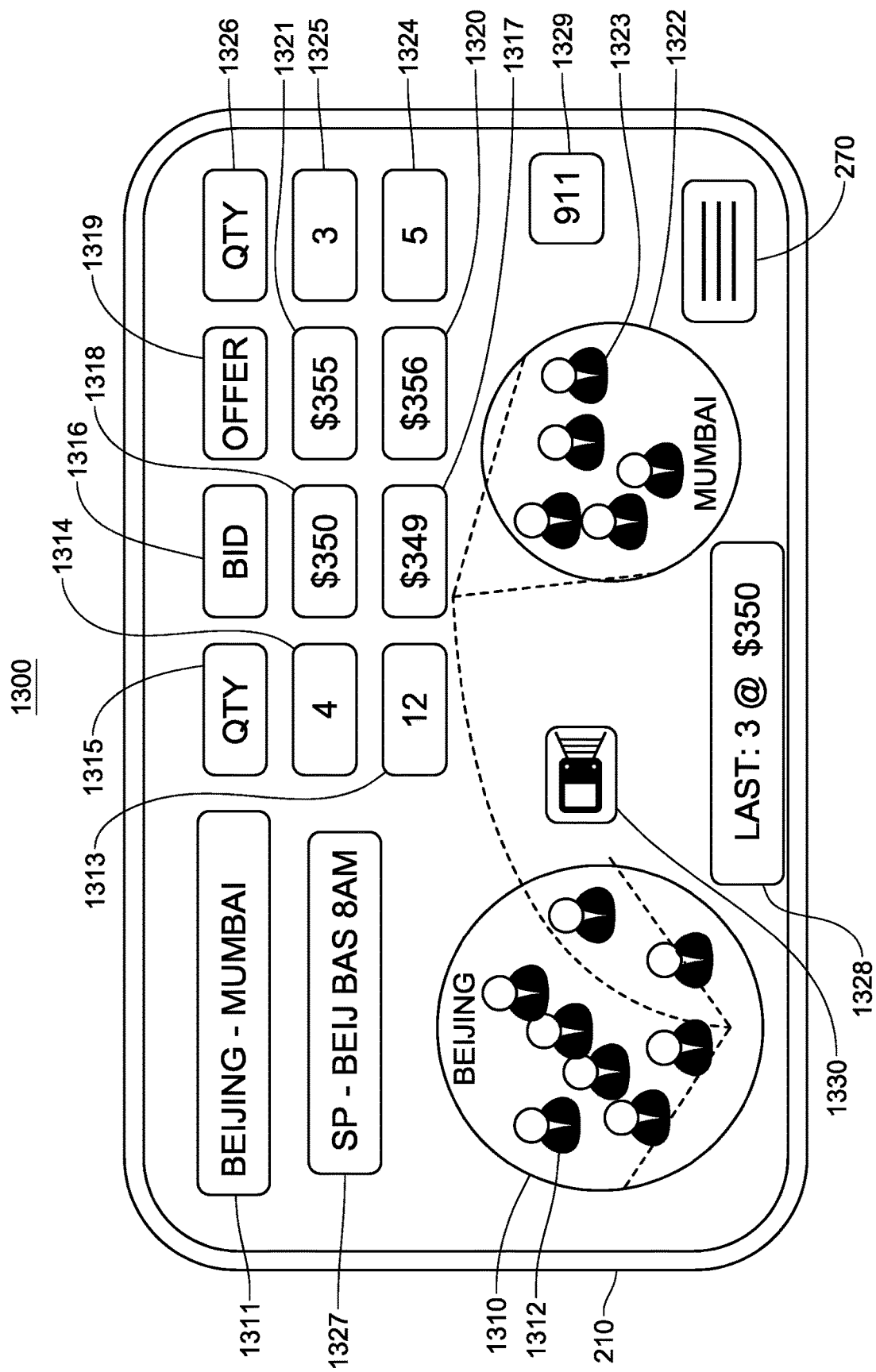
FIG. 13 illustrates exemplary user interfaces for transacting and trading international train transportation capacity in accordance with some embodiments.

FIG. 13 illustrates exemplary user interfaces 210 for participating, transacting, and/or trading transportation as a physical forward commodity between combinations of virtual hubs over various transportation modes. In some embodiments, user interface 210 includes the following elements, or a subset or superset thereof:

Exemplary virtual hub combination 1311;

Exemplary virtual hub origin/from location 1310 with users 1312 within the virtual hub location 1310;

Exemplary specification summary of the market, level of service and time of delivery commencement 1327;

Exemplary mode of transportation capacity type 1330;

Exemplary transaction summary of the last trades quantity and price 1328;

Exemplary virtual hub destination/to location 1322 and user who is being delivered on the transportation capacity unit 1323;

Exemplary bid/buy quantity title header 1315 for an exemplary virtual transportation hub market;

Exemplary bid/buy price title header 1316 for an exemplary virtual transportation hub market;

Exemplary offer/sell price title header 1319 for an exemplary virtual transportation hub market;

Exemplary offer/sell quantity title header 1326 for an exemplary virtual transportation hub market;

Exemplary bid/buy quantity 1314 for the best bid quantity from a plurality of users 110 for an exemplary respective transportation capacity virtual hub combination 1311;

Exemplary bid/buy quantity 1313 for the second-best bid quantity from a plurality of users 110 for an exemplary respective transportation capacity virtual hub combination 1311;

Exemplary bid/buy price 1318 for the best bid price from a plurality of users 110 for an exemplary respective transportation capacity virtual hub combination 1311;

Exemplary bid/buy price 1317 for the second-best bid price from a plurality of users 110 for an exemplary respective transportation capacity virtual hub combination 1311;

Exemplary offer/sell price 1321 for the best offer price from a plurality of users 110 for an exemplary respective transportation capacity virtual hub combination 1311;

Exemplary offer/sell price 1320 for the second-best offer price from a plurality of users 110 for an exemplary respective transportation capacity virtual hub combination 1311;

Exemplary offer/sell quantity 1325 for the best offer quantity from a plurality of users 110 for an exemplary respective transportation capacity virtual hub combination 1311;

Exemplary offer/sell quantity 1324 for the second-best offer quantity from a plurality of users 110 for an exemplary respective transportation capacity virtual hub combination 1311;

Exemplary safety dispatch "911" button 1329 to enact video and audio recording of the user 110 environment and dispatch of that information to authorities.

Exemplary hamburger menu button 270 to move back to menu options and settings away from the participation, transaction, trading GUI 210 embodiment.

In some embodiments, the user 110 may enter a transaction quantity and price for transportation capacity units to participate, transact, and/or trade by the GUI 210 detecting user 110 contact with a bid/buy price 1318 or offer/sell price 1321. The GUI 210 detects user 110 contact with any of the GUI 210 buttons which have been aforementioned. Upon user 110 contact with buttons on the GUI 210, instructions are instantiated which allows the user 110 to change the specifications of the respective virtual hub combination 1311. A plurality of prices and markets may be presented based on a plurality of contract specifications. In some embodiments, the best bid/buy price 1318 may be moving up in price or down in price depending on the market conditions at any given time. In some embodiments, the last trade or last transacted price for a given the user 110 may submit a competitive offer/selling price 1321 or bid/buying price 1314. In some embodiments, users 110 may adjust settings of the GUI 210 to show more bid/buying prices 1317 or more offer/selling prices 1320. In some embodiments, the matrix of market quantities and prices 1313, 1314, 1315, 1316, 1317, 1318, 1319, 1320, 1321, 1324, 1325, 1326 may be referred to as market depth in the GUI 210 embodiment. In some embodiments, the number of users 110 may be displayed as user icons 1312 or 1323 for the amount of people logged who desire to transact, trade, or participate in a given virtual hub 1310 to virtual hub 1322 combination. In some embodiments, users 110 may select the transportation mode 1330, such that the user allows a market for only one form of transportation capacity as a commodity, or the user 110 may allow the system to show multiple forms of transportation capacity between two virtual transportation capacity hubs 1310, 1311, 1322. In some embodiments, the GUI 210 may detect a user 110 selecting the 911 button 1329, which may activate voice and video recording functions on the mobile or stationary device 111 and transmit the data with a confirmation from the user 110 to the authorities to provide enhanced security while participating, transacting, or trading forward transportation as a commodity. In some embodiments, the user may toggle between the GUI 210 market view screen in FIG. 13 and other menu 270 options and settings by the user 110 selecting the hamburger button 270 and the GUI 210 detecting the user 110 input or contact. In some embodiments, the GUI 210 may instantiate instructions in the memory of the mobile computing device 111, which then transmits transportation capacity data through the network 140 or wireless GPS network 150 to call upon instruction routines and instruction sub-routines on the transportation exchange database server 130, virtual hub database server 120, network member database server 160, no arbitrage condition database server 180, and/or instructions in the memory of the cloud and local CPUs 190, which all interface together to make one system that may deliver transportation capacity units to users 110 from and to a plurality of virtual hubs 1310, 1322 with a plurality of specifications at specific market prices.

Figure 14:
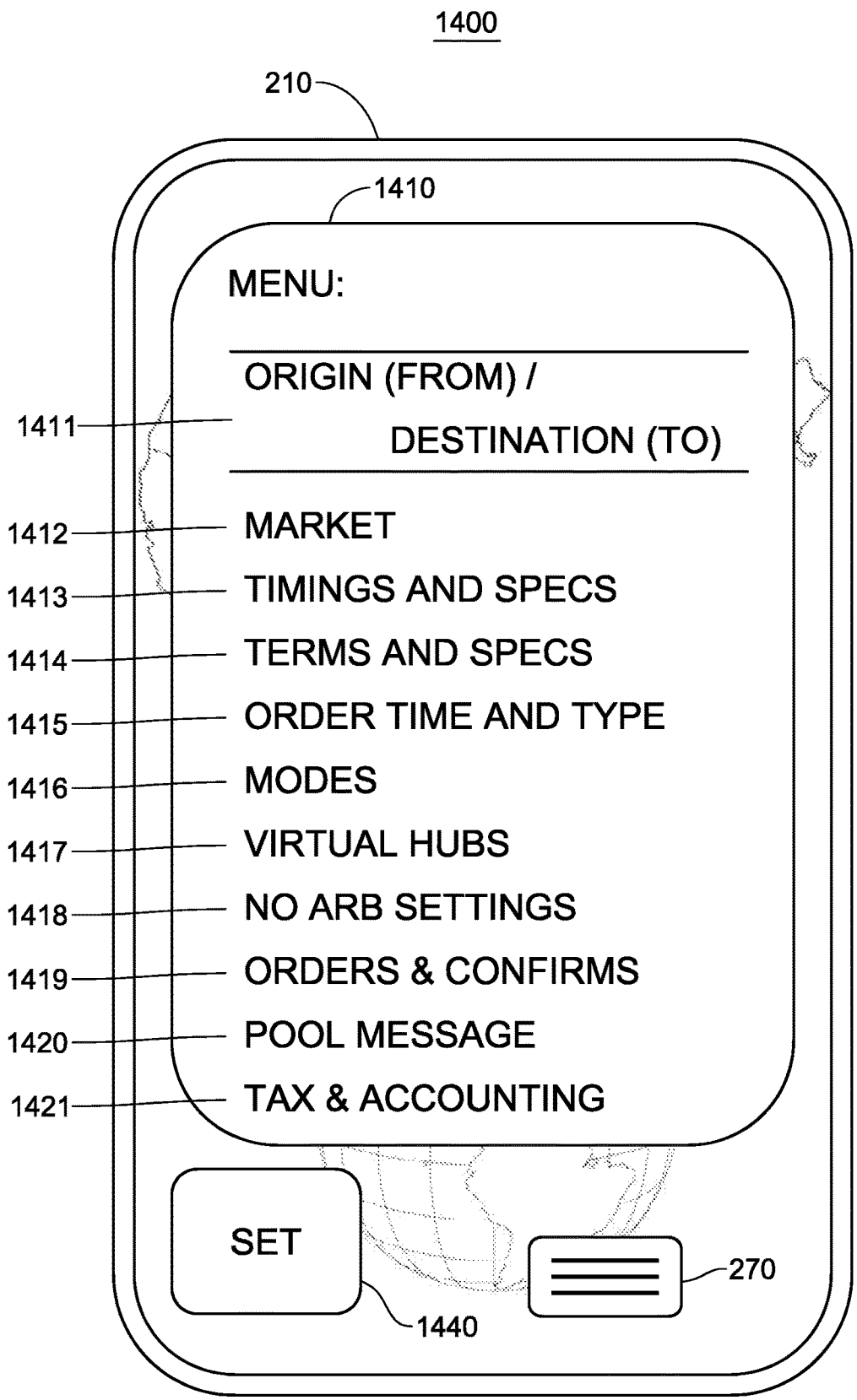
FIG. 14 illustrates exemplary user interfaces for transacting and trading various menu options within the system and method in accordance with some embodiments.

FIG. 14 illustrates an exemplary user interface 210 for selecting menu options 1410 on a portable multifunction device (e.g., a mobile computing device) in accordance with some embodiments. In some embodiments, user interface 210 includes the following elements, or a subset or superset thereof:

Menu options 1410;

Origin (From)/Destination (to) menu option 1411; Market menu option 1412;

Timings and Specs menu option 1413;

Term and Specs menu option 1414;

Order time and type menu option 1415;

Modes menu option 1416;

Virtual Hubs menu option 1417;

No arb settings menu option 1418;

Orders and Confirms menu option 1419;

Pool Message menu option 1420;

Tax and Accounting menu option 1421;

Setting button 1440 to transmit the menu option;

Hamburger button 270 to instruct the GUI 210 to take the user 110 to the menu screen.

In some embodiments, user interface 210 may be used by the user 110 to select a plurality of menu options 1410. In some embodiments, the user 110 may select the origin (from)/destination (to) menu option 1411 which may instruct the GUI 210 to go to an address input rendering 910 and/or FIG. 2. In some embodiments, the user 110 may contact the "market" menu option 1412, which may instruct the GUI 210 to render a market participation, transaction and/or trading screen, such as screens 300, 400, 1100, 1200, or 1300 of FIG. 3, 4, 11, 12, or 13. In some embodiments, the user 110 may contact the "timings and specs" menu option 1413, which may instruct the GUI 210 to render a timings and specs screen, such as screen 500 of FIG. 5. In some embodiments, the user 110 may contact the "term and specs" menu option 1414, which may instruct the GUI 210 to render a term and specs screen, such as screen 600 of FIG. 6. In some embodiments, the user 110 may contact the "order time and type" menu option 1415, which may instruct the GUI 210 to render an order time and type screen, such as screen 700 of FIG. 7. In some embodiments, the user 110 may contact the "modes" menu option 1416, which may instruct the GUI 210 to render a mode screen, such as screen 800 of FIG. 8. In some embodiments, the user 110 may contact the "Virtual Hubs" menu option 1417, which may instruct the GUI 210 to render a virtual hubs screen, such as screen 900 of FIG. 9. In some embodiments, the user 110 may contact the "no arb settings" menu option 1418, which may instruct the GUI 210 to render a no arbitrage constraint screen, such as screen 1000 of FIG. 10. In some embodiments, the user 110 may contact the "orders and confirms" menu option 1419, which may instruct the GUI 210 to render the market orders and transaction confirmations for the user 110. In some embodiments, the user 110 may contact the "pool message" menu option 1420, which may instruct the GUI 210 to message either the actual transportation capacity unit, the opposite seller user 110, or the opposite buyer user 110, depending on if the user 110 was an opposite buyer or seller of the transportation capacity unit. In some embodiments, the user 110 may contact the "tax and accounting" menu option 1421, which may instruct the GUI 210 to render tax and accounting information for the respective user 110. In some embodiments, the GUI 210 menu option selection 1410 may instantiate instructions in the memory of the mobile computing device 111, which then transmits transportation capacity data through the network 140 or wireless GPS network 150 to call upon instruction routines and instruction sub-routines on the transportation exchange database server 130, virtual hub database server 120, network member database server 160, no arbitrage condition database server 180, and/or instructions in the memory of the cloud and local CPUs 190, which all interface together to make one system that may deliver transportation capacity units to users 110 from and to a plurality of virtual hubs 410, 422 with a plurality of specifications at specific market prices.

Figure 15:
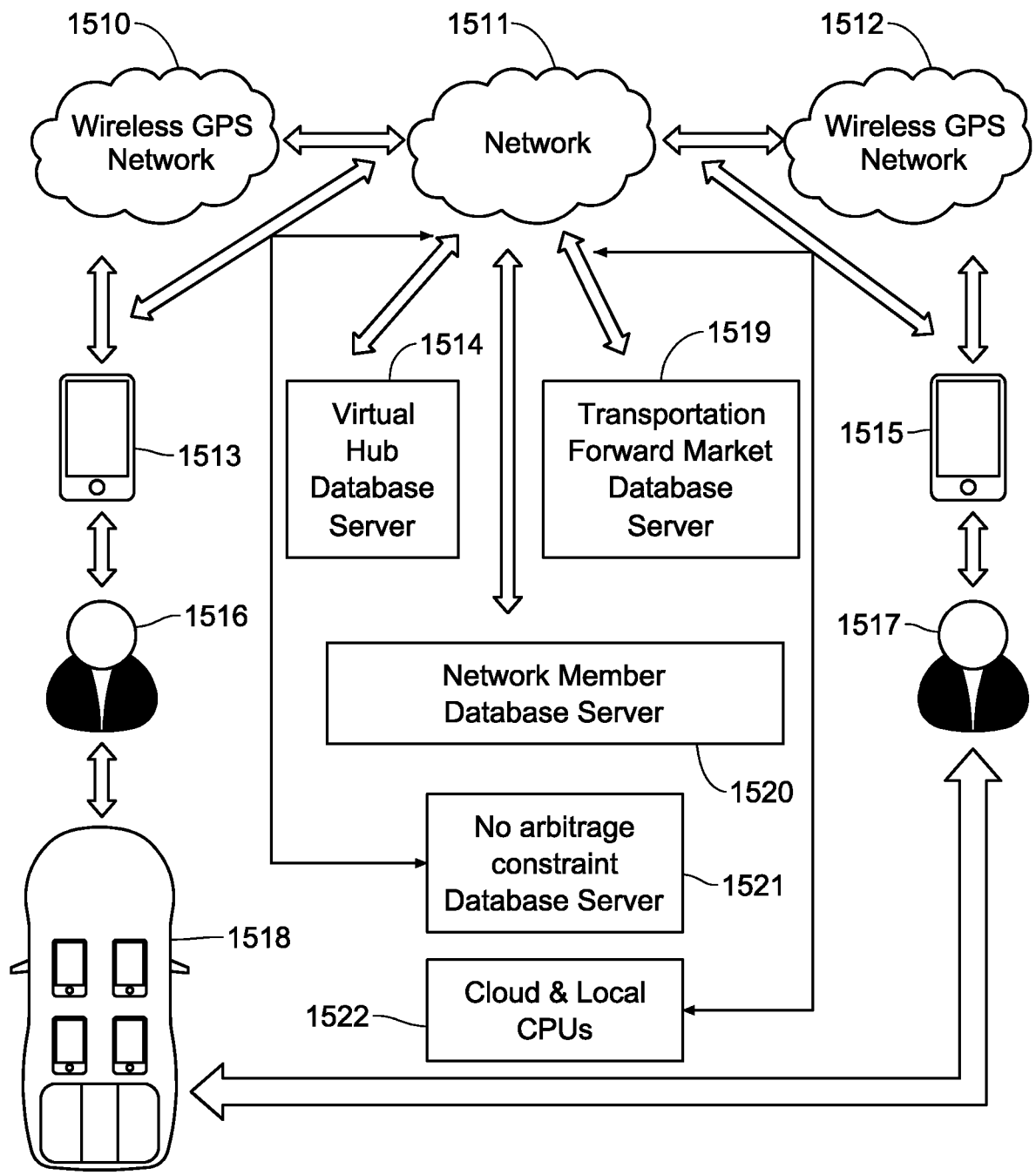
FIG. 15 illustrates a schematic diagram of a network configuration and implementations of methods which support the method and system of trading transportation capacity in accordance with some embodiments.

FIG. 15 illustrates an exemplary network configuration 1500 in one exemplary implementation of participating, transacting, and/or trading transportation capacity units in accordance with some embodiments. In some embodiments, network configuration 1500 includes the following elements, or a subset or superset thereof:

Wireless global positioning system (GPS) network 1510;
Network 1511;
Additional global positioning system (GPS) network 1512;
User member portable multifunction device 1513;
Virtual hub database server 1514;
Transportation exchange database server 1519;
Additional user member portable multifunction device 1515;
Network member database server 1520;
Network member user 1516;
Additional network member user 1517;
No arbitrage constraint database server 1521;
Cloud and Local CPUs 1522; Transportation capacity unit mode 1518.

In some embodiments, the software and/or instructions stored in memory of the cloud & local CPUs 1522 and portable multifunction devices 1513, 1515 may include additional instructions to instantiate specification requirements, participation, transactions, and/or trading on the transportation capacity unit network 1511. In some embodiments, instructions may include standard database web services with the database as service provider (i.e., calling from the outside in), which lets the client GUI 210 or 1513 call each of the virtual hub database server 1514, transportation exchange database server 1519, network member database server 1520, no arbitrage constraint database server 1521, and/or cloud & local CPUs 1522 through the wireless GPS network 1510 or network 1511. In some embodiments, each of the virtual hub database server 1514, transportation exchange database server 1519, network member database server 1520, no arbitrage constraint database server 1521, and/or cloud & local CPUs 1522 may instruct the network to instantiate the database servers 1514, 1519, 1520, 1521, 1522 as service consumers (i.e., calling from the inside out), which lets an SQL query or application module in the database session consume an external web service. In some embodiments, users 1516 and/or 1517 may use portable multifunction devices 1513 and/or 1515 (e.g., mobile computing devices) to access the transportation capacity unit market GUI 210 so that the users 1516 and/or 1517 may participate, transact, and/or trade transportation capacity units. In some embodiments, the virtual hub database server 1514 stores map tile data in addition to user location data, which is utilized by the GUI 210 to display or render location of virtual hubs and user 1516 proximity to those virtual hubs discussed above with respect to FIGS. 2-4, 9, and 11-13. In some embodiments, the transportation exchange database server 1519 stores bid and offer data for respective quantities of users, as well as transaction data and a plurality of market data for each virtual hub combination. In some embodiments, the network member database server 1520 stores user profile, user transaction, user trade, user settings, user specifications, user rating, user criminal history or background check data, user track record, user bank data, user credit card data, user history data, user tax data, and a plurality of other data. In some embodiments, the no arbitrage constraint database server 1521 stores data and algorithms to identify user 110 constraints, such as those discussed above with respect to FIG. 10, and run algorithm calculations for users on specific constraints to check for compliance with constraints. In some embodiments, network servers and CPUs 1514, 1519, 1520, 1521, 1522, 1513, 1515 may interface through the network 1511 and/or wireless GPS networks 1510, 1512, such that transportation capacity units may be participated in, transacted, and/or traded efficiently in the context of a market for transportation capacity units. Included aforementioned data elements may be a subset or superset of data used for any specific calculation to participate, transact, or trade transportation capacity units.

FIG. 16 illustrates a flowchart embodiment of steps a user may perform to participate, transact, and/or trade transportation capacity units between virtual hub combinations. In some embodiments, a user at a mobile or portable multifunction device (e.g., a mobile computing device), a fixed computing device with a touchscreen, a computing device without a touchscreen, or an augmented, mixed reality non-screen display may detect user login to the transportation capacity unit network 1610. In some embodiments, the GUI of the transportation capacity unit network may detect and receive origin location from user input or current GPS coordinate information and detect destination address from user input and transmission of data 1620. In some embodiments, the GUI, CPUs, and/or databases may be used to generate and apply one or more optimization techniques to form a virtual hub with other users that have similar transportation requests within a geographic boundary 1630. In some embodiments, the GUI, CPUs, and or databases may be used to generate instructions for a plurality of computing devices, network, virtual hub database server, network member database server, and transportation exchange database server to form a combination of virtual hubs and contract specifications for delivery of transportation services or capacity between the virtual hubs in a format presented by a graphical user interface, which allows users to enter forward physical prices to sell (offer) or bid (buy) transportation capacity units between virtual hub combinations 1640. In some embodiments, the GUI, CPUs, and or databases may be used to generate instructions to interface a plurality of networks, global positioning systems networks, servers, forward commodity exchanges, grouping software for virtual hubs, transparent open access pricing systems, blockchain audit and safety systems, virtual hub servers and systems, and no arbitrage constraint condition systems, which form one system to implement a forward commodity transportation capacity unit exchange system and method 1650.

Figure 17:
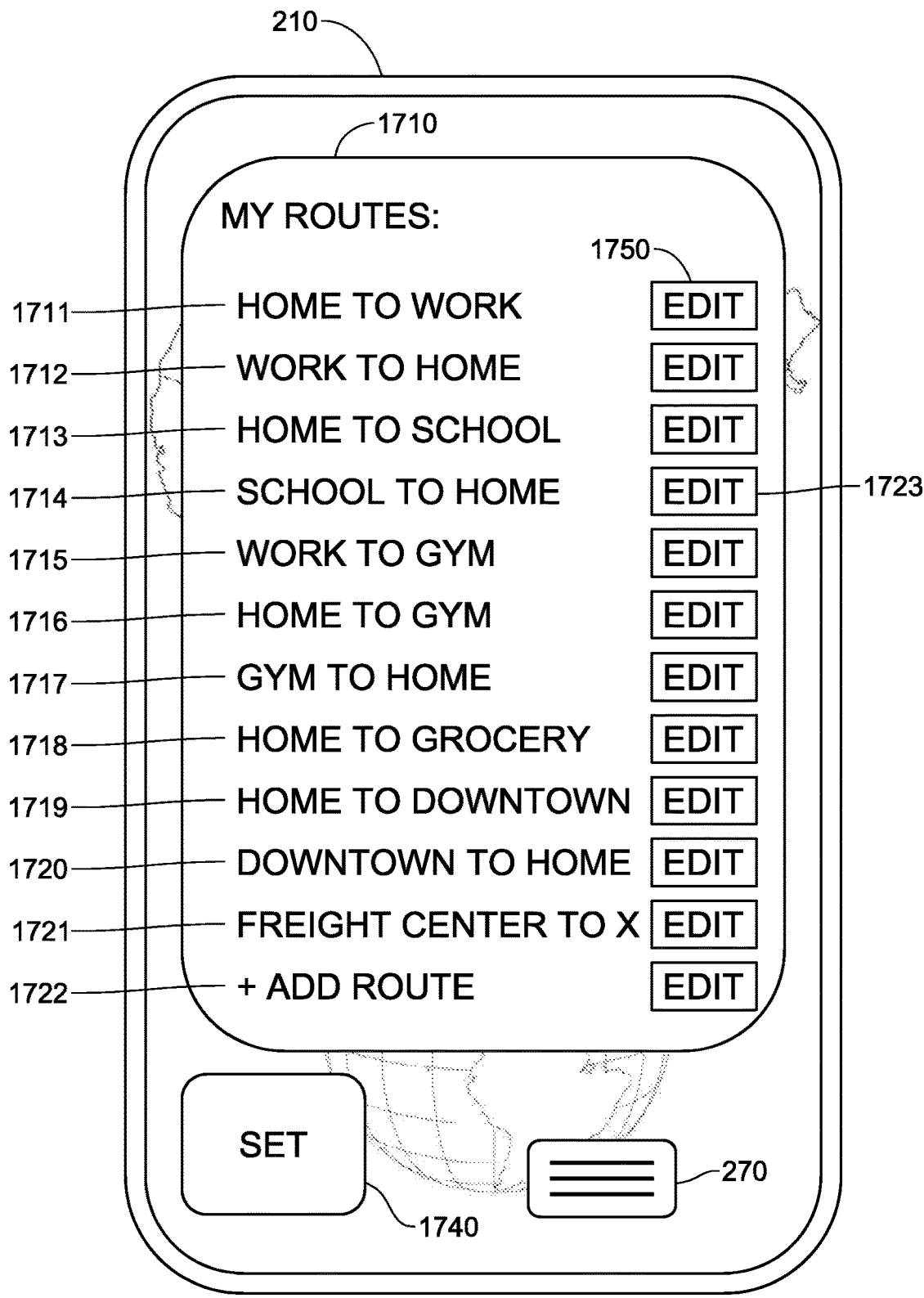
FIG. 17 illustrates exemplary user interfaces for displaying most frequent routes.

FIG. 17 illustrates an exemplary embodiment of a user 110 most frequent transportation routes 1710 in one exemplary implementation of participating, transacting, and/or trading transportation capacity units in accordance with some embodiments. In some embodiments, most frequent my routes includes the following elements, or a subset or superset thereof:

Home to Work 1711;
Work to Home 1712;
Home to School 1713;
School to Home 1714;
Work to Gym 1715;
Home to Gym 1716;
Gym to Home 1717;
Home to Grocery 1718;
Home to Downtown 1719;
Downtown to Home 1720;
Work to Downtown 1721;
+ Add Route 1722
Edit 1723 or 1750;
Setting button 1740 to transmit the My Routes data;
Hamburger button 270 to instruct the GUI 210 to take the user 110 to the menu screen.

In some embodiments, the GUI 210 may be used to select, store, and/or edit user 110 frequent or preferred routes ("MY ROUTES") 1710 for more efficient access to transportation capacity unit markets over various modes and specifications of transportation capacity. In some embodiments, the user 110 may select, store, and/or edit address and specification data for "Home to Work" 1711, "Work to Home" 1712, "Home to School" 1713, "School to Home" 1714, "Work to Gym" 1715, "Home to Gym" 1716, "Gym to Home" 1717, "Home to Grocery" 1718, "Home to Downtown" 1719, "Downtown to Home" 1720, "Work to Downtown" 1721, and/or "+ Add Route" 1722. In some embodiments, the My Routes 1710 module may include any route a user 110 may request on any transportation capacity unit mode and/or specification.

The aforementioned description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, performed by one or more computing devices, comprising:

obtaining, by at least one of one or more satellite navigation systems and one or more wireless networks, transportation data and at least one of member data and constraint data from at least a subset of a plurality of users, wherein the transportation data corresponds to one or more transportation modes configured for use by the plurality of users, and wherein the transportation data from a respective user comprises data corresponding to a transportation capacity, a transportation origin location, a transportation destination location, and a transportation availability for a respective transportation mode of the respective user;

storing each of the transportation data, the member data, and the constraint data on respective database servers;

transmitting, over the one or more wireless networks, the transportation data and at least one of member data and constraint data to one or more computing devices from the respective database servers;

receiving, at one or more computing devices, the transportation data and the at least one of member data and constraint data;

generating, by the one or more computing devices, a plurality of transportation capacity units for at least a subset of the plurality of users based on transportation data and the at least one of member data and constraint data, wherein the one or more computing devices are configured to:

combine the transportation data and the at least one of member data and constraint data as one or more data objects; and store the data objects in one or more databases of the one or more computing devices, wherein each of the one or more data objects corresponds to respective one or more transportation capacity units;

detecting, at respective user interfaces of the plurality of users, user network logins using facial recognition or fingerprint recognition for authentication;

wherein:

the detected user interfaces comprise touchscreen displays or augmented non-screen displays of the plurality of users;

the detected user interfaces comprise graphical user interfaces configured to display one or more integrated or overlayed layers as one or more graphical layers or a graphical list view, wherein the one or more integrated or overlayed layers comprise at least one or more of: buttons, icons, settings tables, or menus configured for selection or manipulation by a respective user of the plurality of users; and providing, by one or more servers coupled to the one or more computing devices by one or more networks, a transportation forward market platform to the detected user interfaces of the plurality of users for trading the plurality of transportation capacity units, wherein the one or more computing devices is configured to affiliate one or more characteristics to the respective one or more transportation capacity units when respective one or more offers for the one or more transportation capacity units are accepted, and wherein each of the one or more affiliated transportation capacity units corresponds to a digital representation of a fungible forward contract for a respective transportation mode of the respective users.

2. The method of claim 1,
wherein providing the transportation forward market platform comprises:
receiving market depth data from the plurality of users, wherein the market depth data comprises data indicating one or more bid prices and one or more offer prices provided by the plurality of users for the plurality of transportation capacity units;
generating one or more layers for the detected user interfaces of the plurality of users, wherein the one or more layers correspond to at least a digital representation of the transportation forward market platform; and
transmitting the market depth data to the plurality of users.

3. The method of claim 2, wherein the market depth data is at least one of configured to be displayed as a graphical layer of one or more layers for the detected user interfaces of the plurality of users or configured to be displayed in a graphical list view corresponding to the one or more layers for the detected user interfaces of the plurality of users, and
wherein transmitting the market depth data comprises:
receiving term specification data from a buying user of the plurality of users, wherein the term specification data indicates a selection by the buying user of a time period for providing the one or more transportation modes to the buying user; and
transmitting the market depth data to the buying user based on at least the received term specification data.

4. The method of claim 2, wherein:
the detected user interfaces comprise one or more navigational user interfaces;
transmitting the market depth data comprises:
receiving the constraint data from the buying user of the plurality of users, wherein the constraint data indicates a selection by the buying user of one or more conditions for providing the one or more transportation modes to the buying user, and wherein the one or more conditions comprise cheapest transmission, single mode of transmission, multiple modes of transmission, fastest transmission, highest rated transmission, most available transmission, highest volume of participants for transmission, most frequent transmission, service level for transmission, pollution reduction, emissions reduction, highest safety and security level for transmission, or combinations thereof; and
transmitting the market depth data to the buying user based on at least the received constraint data.

5. The method of claim 2, further comprising:
receiving updated market depth data for the plurality of transportation capacity units in real time, wherein the updated market depth data comprises data corresponding to one or more updated bid prices and one or more updated real-time offer prices for the plurality of transportation capacity units; and
transmitting at least a portion of the updated market depth data to the plurality of users.

6. The method of claim 2, wherein transmitting the market depth data comprises:
receiving blockchain data corresponding to the plurality of users; and
transmitting the market depth data to the plurality of users based on the blockchain data.

7. The method of claim 2, wherein transmitting the market depth data comprises:
determining a plurality of virtual hubs for the plurality of transportation capacity units based on the transportation data, wherein the plurality of virtual hubs comprises an origin virtual hub corresponding to the transportation origin location for the respective transportation mode;
receiving the transportation destination location data from a buying user of the plurality of users, wherein the transportation destination location data corresponds to a geographic location of the buying user determined using the one or more satellite navigation systems;
determining a destination hub of the plurality of virtual hubs based on the destination location data;
determining one or more virtual hub routes based on the plurality of virtual hubs, wherein a respective virtual hub route corresponds to a geographic route from the origin virtual hub to the destination virtual hub; and
transmitting the market depth data to the buying user based on at least the one or more virtual hub routes.

8. The method of claim 2, wherein the market depth data comprises data indicating a first bid price from a buying user of the plurality of users for the respective transportation capacity unit.

9. The method of claim 8, further comprising receiving transaction input data from the respective user by a selection or a manipulation of at least one of the one or more layers, wherein the transaction input data comprises data indicating an acceptance by the respective user of the first bid price for the respective transportation capacity unit.

10. The method of claim 9, wherein the selection of the manipulation of the at least one of the one or more layers comprises a touchscreen selection or a touchscreen manipulation; and
wherein the transaction input data further comprises time in force data, wherein the time in force data indicates a selection of one or more time in force conditions by the buying user for the acceptance of the first bid price.

11. The method of claim 9, further comprising arranging fora delivery of the respective transportation mode to the buying user from the respective user based on the res pective transportation capacity unit.

12. The method of claim 2, wherein the market depth data further comprises data corresponding to:
a bid queue for the one or more bid prices, wherein the one or more bid prices are ranked in the bid queue from highest price to lowest price, and wherein respective bid prices of the same value are ranked by time in the bid queue; and
an offer queue for the one or more offer prices, wherein the one or more offer prices are ranked in the offer queue from lowest price to highest price, and wherein respective offer prices of the same value are ranked by time in the offer queue.

13. The method of claim 1, wherein the one or more transportation modes comprise an automobile, an aircraft, an autonomous vehicle, a motorcycle, a bicycle, a boat, a bus, a subway car, a taxicab, a train, a delivery vehicle, or combinations thereof, and wherein the member data comprise user profiles, user transaction, user trade, user settings, user specifications, user rating, user criminal history or background check data, user track record, user bank data, user credit card data, user history data, user tax data, or combinations thereof.

14. The method of claim 1, wherein the transportation origin location for the respective transportation mode comprises a geographic location determined using the one or more satellite navigation systems, and wherein the transportation origin location corresponds to a location of the respective user.

15. The method of claim 1, wherein the transportation availability for the respective transportation mode comprises a date when the respective transportation mode is available for use from the transportation origin location, a time when the respective transportation mode is available for use from the transportation origin location, or combinations thereof.

16. The method of claim 1, wherein the fungible forward contract comprise one or more conditional attributes to provide substitutability with another affiliated transportation capacity unit of the plurality of transportation capacity units, and wherein the one or more characteristics correspond to one or more contract specifications, the one or more contract specifications comprising one or more cost of cover specifications, one or more liquidated damages specifications, one or more force majeure specifications, or combinations thereof.

17. A computing system, comprising:
one or more processors; and
at least one memory comprising program instructions executable by the one or more processors to:
obtain, by at least one of one or more satellite navigation systems and one or more wireless networks, transportation data and at least one of member data and constraint data from at least a subset of a plurality of users, wherein the transportation data corresponds to one or more transportation modes configured for use by the plurality of users, and wherein the transportation data from a respective user comprises data corresponding to a transportation capacity, a transportation origin location, a transportation destination location, and a transportation availability for a respective transportation mode of the respective user;
store each of the transportation data, the member data, and the constraint data on respective database servers;
transmit, over the one or more wireless networks, transportation data and at least one of member data and constraint data to one or more computing devices from the respective database servers;
receive the transportation data and the at least one of member data and constraint data from at least a subset of a plurality of users;
generate a plurality of transportation capacity units for at least a subset of the plurality of users based on the transportation data and the at least one of member data and constraint data, wherein to generate the plurality of transportation capacity units the computing system is configured to:
combine the transportation data and the at least one of member data and constraint data as data objects; and
store the data objects in one or more databases of the computing system,
wherein each of the data objects corresponds to one or more transportation capacity units of the plurality of transportation capacity units;
detect, at respective user interfaces of the plurality of users, user network logins using facial recognition or fingerprint recognition for authentication;

wherein:
the detected user interfaces comprise touchscreen displays or augmented non-screen displays of the plurality of users;
the detected user interfaces comprise graphical user interfaces configured to display one or more integrated or overlayed layers as one or more graphical layers or a graphical list view, wherein the one or more integrated or overlayed layers comprise at least one or more of: buttons, icons, settings tables, or menus configured for selection or manipulation by a respective user of the plurality of users; and
provide a transportation forward market platform to the detected user interfaces of the plurality of users for trading the plurality of transportation capacity units, wherein the computing system is configured to affiliate one or more characteristics to the respective one or more transportation capacity units when one or more offers of the one or more transportation capacity units is accepted, and wherein each of the one or more affiliated transportation capacity units corresponds to a digital representation of a fungible forward contract for the transportation mode.

18. The method of claim 17, wherein:
the one or more detected user interfaces comprise one or more navigational user interfaces; and
wherein the at least one memory further comprising program instructions executable by the one or more processors to:
determine a plurality of virtual hubs for the plurality of transportation capacity units based on the transportation data, wherein the plurality of virtual hubs comprises an origin virtual hub corresponding to the transportation origin location for the respective transportation mode.

19. The method of claim 17, wherein to provide the transportation forward market platform, the at least one memory comprising program instructions executable by the one or more processors to:
receive market depth data from the plurality of users, wherein the market depth data comprises data indicating one or more bid prices and one or more offer prices provided by the plurality of users for the plurality of transportation capacity units; and
transmit the market depth data to one or more overlayed or integrated layers of the detected user interfaces as a graphical layer or a graphical list view.

20. The method of claim 19,
wherein to transmit the market depth data, the at least one memory comprising program instructions executable by the one or more processors to:
receive constraint data from a buying user of the plurality of users, wherein the constraint data indicates a selection by the buying user of one or more conditions for providing the one or more transportation modes to the buying user, and wherein the one or more conditions comprise cheapest transmission, single mode of transmission, multiple modes of transmission, fastest transmission, highest rated transmission, most available transmission, highest volume of participants for transmission, most frequent transmission, service level for transmission, pollution reduction, emissions reduction, highest safety and security level for transmission, or combinations thereof; and
transmit the market depth data to the buying user based on at least the received constraint data.

21. The computing system of claim 17, wherein the one or more transportation modes comprise an automobile, an aircraft, an autonomous vehicle, a motorcycle, a bicycle, a boat, a bus, a subway car, a taxicab, a train, a delivery vehicle, or combinations thereof, and wherein the member data comprise user profiles, user transaction, user trade, user settings, user specifications, user rating, user criminal history or background check data, user track record, user bank data, user credit card data, user history data, user tax data, or combinations thereof.

22. The computing system of claim 17, wherein the transportation origin location for the respective transportation mode comprises a geographic location determined using the one or more satellite navigation systems, and wherein the transportation origin location corresponds to a location of the respective user.

23. The computing system of claim 17, wherein the fungible forward contract comprises one or more conditional attributes to provide substitutability with another affiliated transportation capacity unit of the plurality of transportation capacity units, wherein the one or more characteristics correspond to one or more contract specifications, the one or more contract specifications comprising one or more cost of cover specifications, one or more liquidated damages specifications, one or more force majeure specifications, or combinations thereof.

24. A non-transitory computer-readable medium having stored thereon a plurality of computer-executable instructions which, when executed by a computer, cause the computer to:
  obtain, by at least one of one or more satellite navigation systems and one or more wireless networks, transportation data and at least one of member data and constraint data from at least a subset of a plurality of users, wherein the transportation data corresponds to one or more transportation modes configured for use by the plurality of users, and wherein the transportation data from a respective user comprises data corresponding to a transportation capacity, a transportation origin location, a transportation destination location, and a transportation availability for a respective transportation mode of the respective user;
  store each of the transportation data, the member data, and the constraint data on respective database servers;
  transmit, over the one or more wireless networks, transportation data and at least one of member data and constraint data to one or more computing devices from the respective database servers;
  receive the transportation data and the at least one of member data and constraint data from at least a subset of a plurality of users; generate a plurality of transportation capacity units for at least a subset of the plurality of users based on the transportation data and the at least one of member data and constraint data, wherein to generate the plurality of transportation capacity units the computing system is configured to:
    combine the transportation data and the at least one of member data and constraint data as one or more data objects; and
    store the data objects in one or more databases of the computing system, wherein each of the one or more data objects corresponds to respective one or more transportation capacity units of the plurality of transportation capacity units;
  detect, at respective user interfaces of the plurality of users, user network logins using facial recognition or fingerprint recognition for authentication;
  wherein:
    the detected user interfaces comprise touchscreen displays or augmented non-screen displays of the plurality of users;
    the detected user interfaces comprise graphical user interfaces configured to display one or more integrated or overlayed layers as one or more graphical layers or a graphical list view, wherein the one or more integrated or overlayed layers comprise at least one or more of: buttons, icons, settings tables, or menus configured for selection or manipulation by a respective user of the plurality of users; and
  generate one or more layers for the detected user interfaces of the plurality users to display a transportation forward market platform to the plurality of users for trading the plurality of transportation capacity units, wherein the computing system is configured to affiliate one or more characteristics to the respective one or more transportation capacity units when respective one or more offers of the one or more transportation capacity units is accepted, and wherein each of the one or more affiliated transportation capacity units corresponds to a digital representation of a fungible forward contract for a respective transportation mode of the respective users.

25. The non-transitory computer-readable medium of claim 24, wherein the plurality of computer-executable instructions which, when executed by the computer, cause the computer to:
  receive market depth data from the detected user interfaces of the plurality of users, wherein the market depth data comprises data indicating one or more bid prices and one or more offer prices provided by the plurality of users for the plurality of transportation capacity units, wherein the market depth data is at least one of configured to be displayed as a graphical layer of one or more layers for the detected user interfaces configured to be displayed in a graphical list view corresponding to the one or more layers for the detected user interfaces; and
  transmit the market depth data to the plurality of users, and wherein
    the one or more detected user interfaces comprise one or more navigational user interfaces; and
    the selection or the manipulation of the at least one of the one or more layers provides a transmission of transaction input data, wherein the transaction input data corresponds to acceptance data indicating an offer or an acceptance for the respective transportation unit by one of the respective users.

* * * * *